United States Patent
Kim et al.

(10) Patent No.: US 12,057,588 B2
(45) Date of Patent: Aug. 6, 2024

(54) SILICON CARBON NANOCOMPOSITE (SCN) MATERIAL, FABRICATION PROCESS THEREFOR, AND USE THEREOF IN AN ANODE ELECTRODE OF A LITHIUM ION BATTERY

(71) Applicant: EoCell Limited, Hong Kong (CN)

(72) Inventors: Bong Chull Kim, San Jose, CA (US); Jong Su Kim, San Jose, CA (US)

(73) Assignee: EoCell Limited, Singapore (SG)

( * ) Notice: Subject to any disclaimer, the term of this patent is extended or adjusted under 35 U.S.C. 154(b) by 663 days.

(21) Appl. No.: 16/407,048

(22) Filed: May 8, 2019

(65) Prior Publication Data

US 2020/0354222 A1 Nov. 12, 2020

(51) Int. Cl.
*H01M 4/90* (2006.01)
*C01B 32/21* (2017.01)
(Continued)

(52) U.S. Cl.
CPC ....... *H01M 4/9083* (2013.01); *H01M 4/1393* (2013.01); *H01M 4/366* (2013.01);
(Continued)

(58) Field of Classification Search
CPC ......... C01B 32/21; C01B 32/05; C01B 33/02; H01M 4/1393; H01M 4/366; H01M 10/0525; H01M 4/9083; H01M 4/134; H01M 4/1395; H01M 4/386; H01M 4/625; H01M 4/362; H01M 4/587; H01M 10/052;
(Continued)

(56) References Cited

U.S. PATENT DOCUMENTS

| 8,785,049 B2 * | 7/2014 | Kim | H01M 4/1393 |
| | | | 252/503 |
| 2002/0009646 A1 * | 1/2002 | Matsubara | H01M 4/625 |
| | | | 429/231.8 |

(Continued)

FOREIGN PATENT DOCUMENTS

| CN | 107093721 A | 8/2017 |
| EP | 2113955 A1 | 11/2009 |

*Primary Examiner* — Helen Oi K Conley

(57) ABSTRACT

In an embodiment, a process for producing a particulate silicon-carbon nanocomposite (SCN) material includes: providing primary graphite particles carrying nanoscale silicon particles on outer surfaces thereof; performing a high shear mixing procedure to produce primary graphite particles carrying a multiplicity of silicon nanostructures exhibiting plate-like morphologies; distributing a source of amorphous carbon over the primary graphite particles carrying such silicon nanostructures; and producing by way of a carbonization procedure an amorphous carbon layer at least partially surrounding the outer surface of each primary graphite particle, within which such silicon nanostructures are embedded. In an embodiment, each SCN particle can have or be formed as: a graphite particle core; silicon nanostructures distributed across at least portions of the outer surface of the graphite particle core, including silicon nanostructures exhibiting plate-like morphologies; and an amorphous carbon layer encapsulating the silicon nanostructures and at least portions of the graphite particle core.

28 Claims, 14 Drawing Sheets

(51) Int. Cl.
  *H01M 4/1393*   (2010.01)
  *H01M 4/36*     (2006.01)
  *H01M 10/0525*  (2010.01)
  *B82Y 30/00*    (2011.01)

(52) U.S. Cl.
  CPC ......... *H01M 10/0525* (2013.01); *B82Y 30/00* (2013.01); *C01B 32/21* (2017.08)

(58) Field of Classification Search
  CPC ... B82Y 30/00; C01P 2004/20; C01P 2004/64
  See application file for complete search history.

(56) References Cited

U.S. PATENT DOCUMENTS

| | | | | |
|---|---|---|---|---|
| 2009/0269669 | A1* | 10/2009 | Kim | H01M 10/0525 427/113 |
| 2011/0206986 | A1* | 8/2011 | Inagaki | H01M 10/0566 429/217 |
| 2013/0302675 | A1* | 11/2013 | Kouzu | H01M 4/587 429/211 |
| 2016/0344018 | A1* | 11/2016 | Chiu | H01M 4/622 |
| 2016/0365567 | A1 | 12/2016 | Troegel et al. | |
| 2017/0012282 | A1* | 1/2017 | Kondo | H01M 4/587 |
| 2017/0256792 | A1 | 9/2017 | Kondo et al. | |
| 2019/0312264 | A1* | 10/2019 | Shin | H01M 4/386 |

* cited by examiner

SILICON CARBON NANOCOMPOSITE (SCN) MATERIAL, FABRICATION PROCESS THEREFOR, AND USE THEREOF IN AN ANODE ELECTRODE OF A LITHIUM ION BATTERY

TECHNICAL FIELD

Specific aspects of the present disclosure relate to a particulate silicon carbon nanocomposite (SCN) material. Each SCN particle includes a graphite particle core that is at least partially covered by an amorphous carbon layer or matrix having silicon nanostructures embedded therein. At least some of such silicon nanostructures exhibit plate-like morphologies. Aspects of the present disclosure also relate to a process for producing the SCN material, and use thereof in an anode material or anode material composition or anode electrode for an electrochemical cell or a battery structure or battery, e.g., a lithium ion battery.

Background

Rechargeable lithium ion batteries have become the dominant rechargeable power sources in many types of commercial devices e.g., small/portable electronic devices, and in the battery pack system for electrical vehicles. They utilize an organic electrolyte solution, and thus have twice the discharge voltage of conventional batteries that utilize alkaline aqueous electrolyte solutions.

With respect to cathode materials or positive active materials for rechargeable lithium ion batteries, lithium transition element composite oxides that are capable of intercalating lithium, such as $LiCoO_2$, $LiMn_2O_4$, and $LiNi_{1-x}Co_xO_2$ ($0<x<1$) have been researched, among others.

With respect to anode materials or negative active materials, various carbon-based materials capable of intercalating and deintercalating lithium ions, such as such as artificial graphite, natural graphite, and hard carbon, have been used. However, due to the need for stability and significantly enhanced capacity, efforts have recently been directed to anode materials based upon or containing silicon. Further improvements are needed in order to produce silicon based or silicon containing anode materials having sufficiently high capacity and good cycle life retention to be useful across a wide or very wide variety of systems or devices that utilize rechargeable lithium ion batteries as their power source(s).

SUMMARY

In accordance with an aspect of the present disclosure, a silicon-carbon nanocomposite (SCN) material includes, consists essentially of, or is formed as SCN particles, wherein each SCN particle comprises or consists essentially of: a graphite particle core having an outer surface; silicon nanostructures distributed across at least portions of the outer surface of the graphite particle core, including silicon nanostructures exhibiting plate-like morphologies; and an amorphous carbon layer or matrix that encapsulates the silicon nanostructures and at least portions of the graphite particle core.

For each SCN particle, the amorphous carbon layer or matrix and the silicon nanostructures encapsulated therein at least partially fills-in variations in the contours or topography of the outer surface of the graphite particle core in a conformal manner.

For each SCN particle, for each silicon nanostructure exhibiting a plate-like morphology, with respect to three orthogonal axes relative to which the silicon nanostructure is positioned or aligned: a first axis extends along a largest or longest physical span or spatial extent of the silicon nanostructure that establishes the silicon nanostructure's length; a second axis orthogonal to the first axis extends along a next largest, smaller but approximately equivalent, or approximately equivalent physical span or spatial extent of the silicon nanostructure that establishes the silicon nanostructure's width; and a third axis orthogonal to the first and second axes extends along a smallest physical span or spatial extent of the silicon nanostructure that establishes the silicon nanostructure's thickness.

Each SCN particle typically carries a multiplicity of silicon nanostructures exhibiting plate-like morphologies, wherein a mean aspect ratio of each silicon nanostructure exhibiting plate-like morphology defined by a ratio of the thickness of the silicon nanostructure to the length of the silicon nanostructure within a cross sectional plane through the amorphous carbon layer or matrix is typically between 0.20-0.60.

Within the multiplicity of silicon nanostructures, the silicon nanostructures typically exhibit a median length between 50-300 nm.

Within the multiplicity of silicon nanostructures, the nanosilicon grains thereof typically exhibit an average size or diameter of up to 50 nm, e.g., between 10-45 nm.

The aforementioned amorphous carbon layer or matrix typically has a thickness between 250-1500 nm.

Each SCN particle typically exhibits a mass ratio of graphite: silicon:amorphous carbon of 70-90:5-20:5-20, in a manner that includes nonzero amounts of each of silicon, graphite, and amorphous carbon, and which totals to 100%.

In some embodiments, at least some SCN particles within the SCN material can exhibit an approximate mass ratio of graphite:silicon:amorphous carbon of 80:10:10.

In the SCN material, the graphite particle core typically has a porosity of less than 15%. For instance, the graphite particle core can be a synthetic graphite particle having a porosity of less than 3%.

In accordance with an aspect of the present disclosure, a process for producing a particulate silicon-carbon nanocomposite (SCN) material includes or consists essentially of: providing or producing a first powder comprising primary graphite particles having nanoscale silicon particles on outer surfaces thereof; subjecting the first powder to a high shear mixing procedure to produce a second powder comprising primary graphite particles carrying silicon nanostructures distributed on the outer surfaces thereof, wherein the silicon nanostructures include a multiplicity of silicon nanostructures having plate-like morphologies; distributing a source of amorphous carbon over or across the primary graphite particles carrying silicon nanostructures in the second powder; and producing by way of a carbonization procedure an amorphous carbon layer or matrix at least partially surrounding the outer surface of each primary graphite particle, and within which the silicon nanostructures having plate-like morphologies carried by each primary graphite particle are embedded.

The primary graphite particles in various embodiments comprise synthetic graphite particles having a porosity of less than 15%, e.g., the primary graphite particles can be synthetic graphite particles having a porosity of less than 3%.

The carbonization procedure is typically performed at a temperature between 700-1000° C. in a furnace.

In various embodiments, the source of amorphous carbon includes pitch. For instance, the source of amorphous carbon can include or be solid pitch particles.

Distributing the source of amorphous carbon over or across the graphite particles carrying silicon nanostructures can include: mixing solid pitch particles with the graphite particles carrying silicon nanostructures to form a third powder; and softening and/or melting the pitch particles within the third powder, while concurrently subjecting the third powder to mixing forces.

Softening and/or melting the pitch particles within the third powder can include subjecting the pitch particles therein to a temperature between 200-550° C., wherein subjecting the third powder to mixing forces comprises at least one of rotating the third powder and subjecting the third powder to a kneading procedure in a kneading machine.

In some embodiments, softening and/or melting the pitch particles within the third powder while concurrently subjecting the pitch particles subjecting the third powder to mixing forces includes: rotating the third powder in a rotary furnace; and subjecting the third powder to a temperature between 200-550° C. in the rotary furnace. Moreover, the carbonization procedure can include carbonizing the source of amorphous carbon at a temperature between 250-1000° C. in the rotary furnace.

Each of: providing the first powder, subjecting the first powder to a high shear mixing procedure; combining and mixing the graphite particles carrying silicon nanostructures on the outer surfaces thereof with a source of amorphous carbon; distributing the source of amorphous carbon over or across the graphite particles carrying silicon nanostructures; and producing the amorphous carbon layer or matrix occurs under an inert or essentially inert atmosphere.

In various embodiments, the high shear mixing procedure occurs in a temperature controlled manner by way of a temperature control system, mechanism, or chiller that maintains a high shear mixing temperature of less than 40° C.

The above process can further include milling and/or sieving the graphite particles carrying the amorphous carbon layer within which the silicon nanostructures having plate-like morphologies are embedded to eliminate particles having median particle sizes greater than a predetermined maximum median particle size.

The above process can further include prior to providing or producing a first powder: (a) providing or producing a slurry carrying or formed as: a solvent carrying nanoscale silicon particles; graphite particles; and a binder; and (b) drying the slurry under an inert or essentially inert atmosphere to obtain the first powder; and maintaining the first powder under the inert or essentially inert atmosphere.

In accordance with a further aspect of the present disclosure, a lithium ion (Li-ion) battery includes of consists essentially of an anode electrode carrying a particulate SCN material containing SCN particles having particle structures in accordance with an embodiment of the present disclosure, and/or produced in accordance with an embodiment of the present disclosure, such as an SCN material as set forth above or below.

The Li-ion battery further includes: a cathode electrode; a liquid or solid state electrolyte; a separator; and a pouch, prismatic, or cylindrical structure in which the anode electrode, the cathode electrode, the separator and the electrolyte reside.

In such a Li-ion battery, in various embodiments the SCN material of the anode electrode carries or contains approximately 3-20% SCN particles mixed with approximately 80-97% additional graphite particles by mass. For instance, the SCN material of the anode electrode can carry or contain 10-15% SCN particles mixed with approximately 85-90% additional graphite particles by mass.

DETAILED DESCRIPTION

Figure 1A:
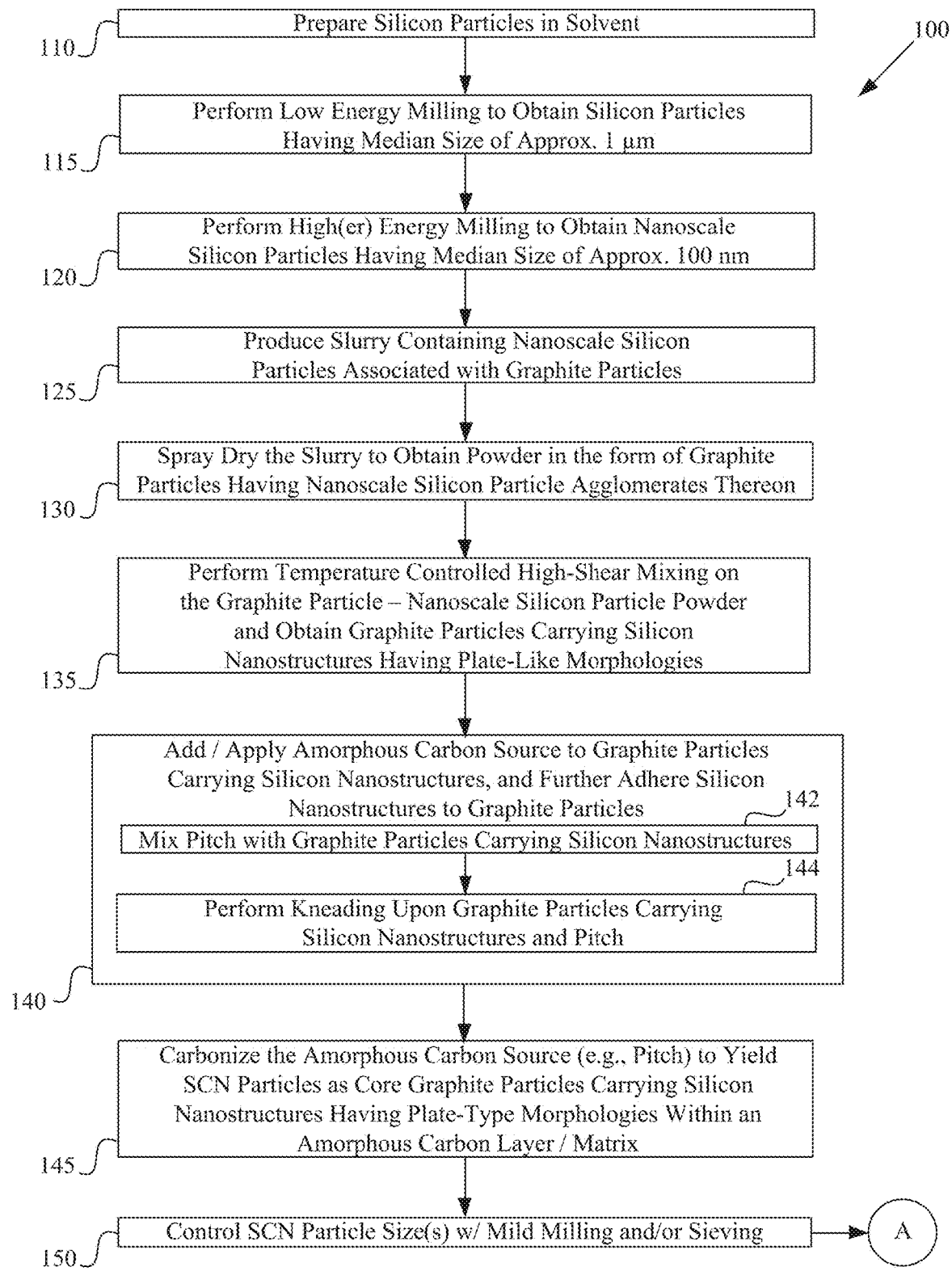
FIGS. 1A-1B are a flow diagram of a first process for producing a particulate silicon carbon nanocomposite (SCN) material, characterizing and testing aspects of the particulate SCN material, and using the particulate SCN material as an anode material or negative active material in an anode structure in accordance with an embodiment of the present disclosure.

Throughout this specification, unless the context stipulates or requires otherwise, any use of the word "comprise," and variations such as "comprises" and "comprising," imply the inclusion of a stated integer or step or group of elements or steps but not the exclusion of any other integer or step or group of elements or steps.

The reference in this specification to any prior publication (or information derived from it), or to any matter which is known, is not, and should not be taken as an acknowledgment or admission or any form of suggestion that prior publication (or information derived from it) or known matter forms part of the common general knowledge in the field of endeavor to which this specification relates.

As used herein, the term "set" corresponds to or is defined as a non-empty finite organization of elements that mathematically exhibits a cardinality of at least 1 (i.e., a set as defined herein can correspond to a unit, singlet, or single element set, or a multiple element set), in accordance with known mathematical definitions (for instance, in a manner corresponding to that described in An Introduction to Mathematical Reasoning: Numbers, Sets, and Functions, "Chapter 11: Properties of Finite Sets" (e.g., as indicated on p. 140), by Peter J. Eccles, Cambridge University Press (1998)). Thus, a set includes at least one element. In general, an element of a set can include or be one or more portions of a structure, an object, a process, a composition, a physical parameter, or a value depending upon the type of set under consideration.

Herein, reference to one or more embodiments, e.g., as various embodiments, many embodiments, several embodiments, multiple embodiments, some embodiments, certain embodiments, particular embodiments, specific embodiments, or a number of embodiments, need not or does not mean or imply all embodiments.

The FIGS. included herewith show aspects of non-limiting representative embodiments in accordance with the present disclosure, and particular structures or features shown in the FIGS. may not be shown to scale or precisely to scale relative to each other. The depiction of a given element or consideration or use of a particular element number in a particular FIG. or a reference thereto in corresponding descriptive material can encompass the same, an equivalent, an analogous, categorically analogous, or similar element or element number identified in another FIG. or descriptive material associated therewith. The presence of "/" in a FIG. or text herein is understood to mean "and/or" unless otherwise indicated. The recitation of a particular numerical value or value range herein is understood to include or be a recitation of an approximate numerical value or value range, for instance, within +/−20%, +/−15%, +/−10%, +/−5%, +/−2.5%, +/−2%, +/−1%, −/+0.5%, or +/−0%. The term "essentially all" can indicate a percentage greater than or equal to 90%, for instance, 92.5%, 95%, 97.5%, 98%, 98.5%, 99%, 99.5%, or 100%.

Various embodiments in accordance with the present disclosure are directed to a particulate silicon carbon nanocomposite (SCN) material formed of individual underlying, inner, or core graphite particles that are each at least partially surrounded, covered, or overlaid with an amorphous carbon layer or matrix having silicon nanostructures and/or nano-powders carried, embedded, or encapsulated therein. The silicon nanostructures and/or silicon nano-powders typically exhibit, are organized as, or are formed of silicon nano-grains. For purpose of simplicity and brevity, silicon nanostructures and silicon nano-powders are referred to herein as silicon nanostructures.

Depending upon embodiment details, the core graphite particles can include or be unitary or separate isolated individual pieces or granules of graphite in particulate form, and/or possibly at least some aggregates of particulate graphite. For purpose of simplicity and brevity, core graphite particles that exist in unitary or separate/isolated form (i.e., not as particulate aggregates) and core graphite particles that exist in aggregate form (i.e., not as unitary or separate/isolated individual graphite particles or granules) are referred to herein as core graphite particles.

For a given SCN particle, its amorphous carbon layer contains non-spheroidal silicon nanostructures, e.g., primarily or essentially entirely non-spheroidal silicon nanostructures (e.g., in several embodiments, fewer than approximately 5-20%, or possibly fewer than approximately 8-13% of the silicon nanostructures carried by SCN particles produced in a manner described herein are spheroidal). More particularly, within the amorphous carbon layer at least some of the silicon nanostructures, and in several embodiments many or the majority or nearly or essentially all of the silicon nanostructures, exhibit plate-like morphologies, e.g., the silicon nanostructures typically exhibit plate-like profiles or shapes. For instance, a given or typical SCN particle under consideration typically carries a multiplicity of silicon nanostructures having plate-like morphologies.

Still more particularly, for each silicon nanostructure exhibiting a plate-like morphology, with respect to three orthogonal axes relative to which the silicon nanostructure is positioned or aligned, a first axis can be defined extending along a largest or longest physical span or spatial extent of the silicon nanostructure that establishes the silicon nanostructure's approximate length (hereafter "length" for purpose of simplicity and brevity); a second axis (orthogonal to the first axis) can be defined extending along a next largest, smaller but approximately equivalent, or approximately equivalent physical span or spatial extent of the silicon nanostructure that establishes the silicon nanostructure's approximate width (hereafter "width" for purpose of simplicity and brevity); and a third axis (orthogonal to the first and second axes) can be defined extending along a smallest physical span or spatial extent of the silicon nanostructure that establishes the silicon nanostructure's approximate thickness (hereafter "thickness" for purpose of simplicity and brevity). For various silicon nanostructures having plate-like morphologies, the thickness of each silicon nanostructure can be or typically is less or significantly less than the silicon nanostructure's length, e.g., by approximately 10-90% or more, or typically approximately 20-80% or more. With respect to general or approximate a three dimensional (3D) geometric shape or profile, each such silicon nanostructure can have a first generally planar two dimensional (2D) surface, e.g., which can be defined as a first surface, defined the silicon nanostructure's length and width; and an opposing second generally planar 2D surface, e.g., which can be defined as a second surface. The first surface is separated from the second surface by the silicon nanostructure's thickness, which in some embodiments can at least somewhat vary across the silicon nanostructure's length and/or width. Silicon nanostructures exhibiting plate-like morphologies within the amorphous carbon layer can at least partially or generally physically resemble or correspond to sheet-like structures (e.g., nanosheets), tile-like nanostructures (e.g., nanotiles), flake-like nanostructures (e.g., nanoflakes), bar-like structures (e.g., nanobars), rod-like structures (e.g., nanorods), disc-like structures (e.g., nanodiscs), and/or other type of structures such as block-like structures (e.g., nanoblocks).

In at least some though not necessarily all embodiments, the core graphite particles carry such plate-like silicon nanostructures essentially entirely or only on their outer surfaces, such that the plate-like silicon nanostructures are essentially absent or are entirely excluded from pores within the graphite particles.

Multiple embodiments in accordance with the present disclosure are also directed to a fabrication process for producing such an SCN material. Further embodiments in accordance with the present disclosure are directed to anode structures or anodes carrying such an SCN material, which are suitable for use in electrochemical cells or battery structures such as lithium ion batteries. An SCN material in accordance with an embodiment of the present disclosure can be referred to as a negative active material, in a manner readily understood by individuals having ordinary skill in the relevant art.

Figure 1B:
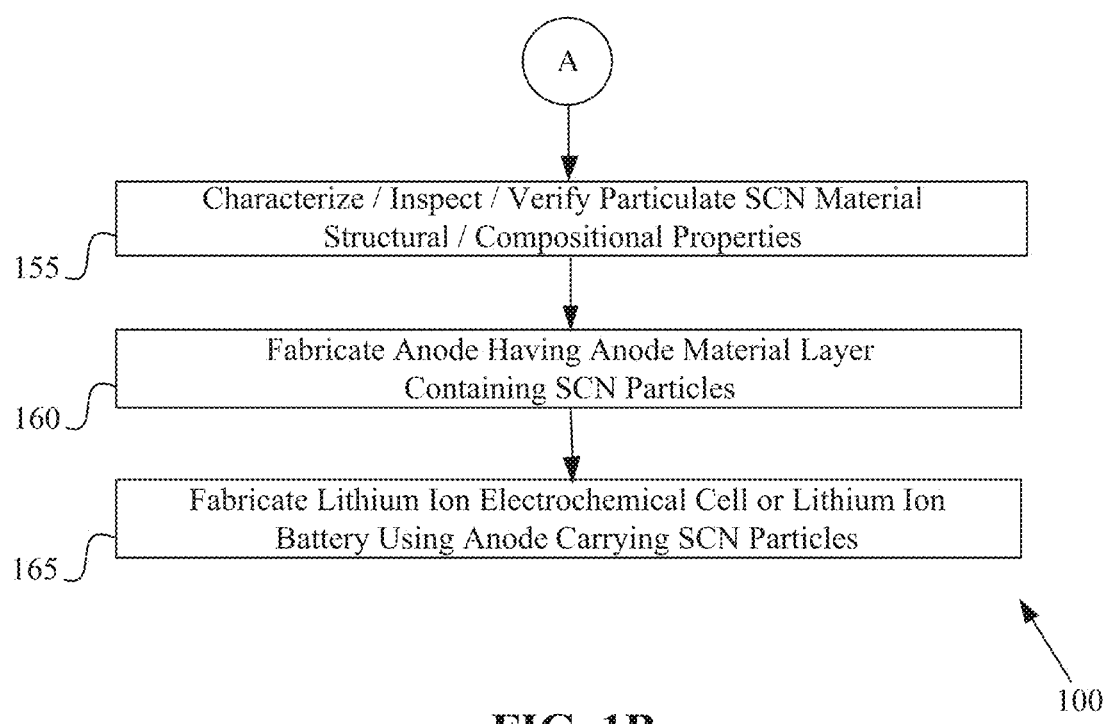

FIGS. 1A-1B are a flow diagram of a first process 100 for producing a particulate SCN material; characterizing and testing aspects of the particulate SCN material; and using the particulate SCN material in accordance with certain embodiments of the present disclosure. In an embodiment, the first process 100 includes a first process portion 110 involving obtaining, providing, or producing a solvent carrying silicon particles, e.g., first/initial or source silicon particles, e.g., by way of adding a predetermined mass of silicon particles to a vessel containing a predetermined mass or volume of solvent. In several embodiments, the solvent is isopropyl alcohol (IPA), which prevents or minimizes the likelihood of silicon particle oxidation; and the mass ratio of solvent: silicon particles is approximately 2:1. Additional or other solvents can be utilized in specific embodiments, in a manner readily understood by individuals having ordinary skill in the relevant art. The silicon particles can be crystalline silicon particles having a median size (e.g., D50) of approximately 5 micrometers (μm), and/or amorphous silicon particles having a median size of between approximately 2-10 μm. Typically, the silicon particles have a purity of at least approximately 99%. The formation of this solvent carrying silicon particles occurs under a moisture-contents-controlled atmosphere in order to avoid silicon particle oxidation.

A second process portion 115 involves obtaining or producing silicon particles having a median size of approximately 1 μm, for instance, by way of a first or low energy milling procedure, such as pre-milling the silicon particles carried by the solvent using an attrition mill or impact mill. In a representative implementation, the attrition mill is conventional, and the silicon particles in solvent are subjected to attrition milling for about 30 minutes at approximately 50 revolutions per minute (rpm) at a temperature of approximately 25° C. During or in association with the second process portion 115, the volumetric ratio of solvent:

silcon particles can be maintained at approximately 80:20. The low energy milling procedure also occurs under a moisture-content-controlled atmosphere, in a manner readily understood by individuals having ordinary skill in the relevant art.

A third process portion 120 involves obtaining or producing nanometer scale or nanoscale silicon particles in solvent, for instance, silicon particles having a median size of approximately 100 nanometers (nm), e.g., by way of subjecting the pre-milled silicon particles in solvent to a set of second or higher or high energy mixing and/or milling procedures. In multiple embodiments, such higher) energy mixing and/or milling procedures are performed by way of a conventional bead mill. To increase milling efficiency, the milling can include or be performed as two step milling using two different bead-sizes in sequence, e.g., using a first bead size of approximately 0.8-0.4 mm, followed by a second bead of approximately 0.05-0.3 mm. The set of higher or high energy mixing procedures also occurs under a moisture-content-controlled atmosphere.

A fourth process portion 125 involves obtaining or producing a slurry containing nanoscale silicon particles physically associated with or coupled to first, primary, or source graphite particles, e.g., by way of combining and mixing nanoscale silicon particles with graphite particles and a binder under conditions that minimize, avoid, or prevent oxidation of the nanoscale silicon particles. In several embodiments, the fourth process portion 125 involves combining and mixing the nanoscale silicon particles in solvent obtained or produced by way of the third process portion 120 with graphite particles and a binder using a flow dispersion mill. Depending upon embodiment details, the graphite particles can be synthetic graphite particles (also commonly referred to as artificial graphite particles) and/or natural graphite particles, where the graphite particles typically have a median particle size between approximately 5-25 μm, e.g., about 15-20 μm. Individuals having ordinary skill in the art will recognize that modified synthetic graphite particles for low swelling and good cycle life retention typically have a surface area of approximately 1.5-2.5 $m^2/g$, whereas natural graphite particles before surface modification typically have a surface area of approximately 8-12 $m^2/g$. In multiple though not necessarily all embodiments, the graphite particles are synthetic graphite particles without the intentional inclusion or addition of natural graphite particles, e.g., in the absence of natural graphite particles. The graphite particles typically have a generally low, low, or very low porosity, for instance, a porosity of less than about 20-25%, or approximately 15% or less, e.g., less than approximately 10%, less than approximately 5%, or less than approximately 3%. Individuals having ordinary skill in the art will also recognize that synthetic graphite particles can exist in irregular forms, or mesocarbon microbead (MCMB) graphite particles. Such individuals will also recognize that irregular graphite particles typically exhibit shapes that are at least somewhat more irregular and less spheroidal than MCMB graphite particles. In several embodiments, the synthetic graphite particles are conventional irregular synthetic graphite particles, without the intentional inclusion or addition, or without the presence, of MCMB graphite particles. In other embodiments, the synthetic graphite particles are MCMB graphite particles in the absence of irregular synthetic graphite particles; while in still other embodiments, the synthetic graphite particles can be a combination of irregular synthetic graphite particles and MCMB graphite particles.

In the fourth process portion 125, the binder can include or be polyvinyl alcohol (PVA), and/or another type of binder such as polyvinyl butyral (PVB) resin. In particular embodiments, the mass ratio of nanoscale silicon particles:graphite particles is adjusted to a final intended or target ratio for SCN material, and the binder is added in an amount of approximately 2% by weight of the combined weight of nanoscale silicon particles plus graphite particles. In a representative implementation, the flow dispersion mill is conventional, and the nanoscale silicon particles in solvent, graphite particles, and binder can be mixed in accordance with the relative ratios set forth above using a circulation gap of approximately 0.3 mm and a rotor spinning speed of approximately 5,000 rpm for about 3 hours at approximately 25° C. to obtain or produce the slurry. Producing the slurry also occurs under a moisture-content-controlled atmosphere. The produced slurry can have a solids content of between approximately 20-40%, e.g., about 30%.

It can be noted that in the fourth process portion 125, synthetic graphite particles having at least somewhat irregular shapes such as conventional irregular synthetic graphite particles can be used, and/or synthetic graphite particles having generally or approximately spheroidal shapes such as conventional MCMB graphite particles can be used. In multiple though not necessarily all embodiments, the fourth process portion 125 utilizes irregular synthetic graphite particles, in the absence of intentional introduction or addition of MCMB graphite particles.

A fifth process portion 130 involves spray drying the slurry produced or obtained by way of the fourth process portion 120 under an inert or essentially inert atmosphere or environment, such as a nitrogen or argon gas atmosphere, e.g., in which oxygen content is maintained below about 3%. Spray drying can aid or enhance the distribution uniformity or homogeneity of nanoscale silicon particles on, over, or across the outer or exterior surfaces of the graphite particles, reducing the likelihood of undesirable or excess agglomeration/aggregation of nanoscale silicon particles on the graphite particles. In a representative implementation, the spray dryer is conventional, and the slurry is spray dried using nitrogen or argon gas at a temperature between about 80-165° C., a pressure between approximately 1-2 kiloPascals (kPa), and a slurry flow rate of about 15 liters per hour (L/h). Specific spray drying parameters can depend upon the capacity and capabilities of the spray dryer employed, in a manner readily understood by individuals having ordinary skill in the relevant art. For instance, using the aforementioned spray dryer, approximately 6-7 kilograms (kg) of slurry obtained from the fourth process portion 125 and having an initial solids content at the outset of the fifth process portion 130 between about 20-40%, e.g., approximately 30%, can be nitrogen spray dried in accordance with the above spray drying parameters. Following slurry drying, the graphite particles carrying the nanoscale silicon particles are maintained under a moisture-content-controlled atmosphere.

After the slurry has been spray dried, nanoscale silicon particles are disposed or distributed on, over, or across the outer or exterior surfaces of the graphite particles. While at least somewhat or approximately uniform distribution of nanoscale silicon particles over the outer surfaces of the graphite particles is generally intended, this is not required or absolutely required, e.g., at least some agglomerates or aggregates of nanoscale silicon particles can exist on localized regions of the outer surfaces of the graphite particles.

A sixth process portion 135 involves distributing or spreading, or further distributing or spreading, the nanoscale silicon particles across or over the outer surfaces of the graphite particles, and possibly modifying or transforming, or further modifying or transforming, the physical nature or structural characteristics of the nanoscale silicon particles. More particularly, in various embodiments, the sixth process portion 135 involves (a) further distributing or spreading the nanoscale silicon particles across the outer surfaces of the graphite particles, while possibly simultaneously (b) physically modifying or transforming, or further modifying or transforming, the structural characteristics of the nanoscale silicon particles such that many or the majority, nearly all, or essentially all of the nanoscale silicon particles present on the outer surfaces of the graphite particles become modified or transformed, or further modified or transformed, into silicon nanostructures exhibiting plate-like or more plate-like morphologies, e.g., plate-like morphologies as set forth above. Thus, graphite-silicon nanostructure particles are produced by way of the sixth process portion 135, where the silicon nanostructures exhibit plate-like morphologies.

In multiple embodiments, the sixth process portion 135 includes at least one high shear mixing procedure. The inventor named on the present patent application found that shear forces or shear stresses generated (e.g., by way of impact events) during a high shear mixing procedure can modify or transform the geometric profiles or shapes exhibited by the nanoscale silicon particles present on the outer surfaces of the graphite particles following the fifth process portion 130. Additionally, by way of shear forces or shear stresses, the sixth process portion 135 can reduce the presence of or remove pure nanoscale silicon particles, aggregated nanoscale silicon particles, and at least some graphite particle agglomerations present upon completion of the fifth process portion 130. In multiple embodiments, after or upon termination of the sixth process portion 135, many or the majority or nearly or essentially all of the silicon nanostructures carried by the graphite particles exhibit plate-like morphologies.

In can be noted that in during the sixth process portion 135, irregular synthetic graphite particles can be transformed into more-spheroidal or quasi-spheroidal graphite particles (providing increased surface area compared to the initial, source, or original irregular synthetic graphite particles); and MCMB graphite particles can become less perfectly spheroidal, e.g. more quasi-spheroidal.

The sixth process portion 135 occurs under an inert or essentially inert atmosphere, such as a nitrogen or argon gas atmosphere. In a representative implementation, the sixth process portion 135 utilizes a conventional high shear mixer, which can mix the graphite particles on which the agglomerated nanoscale silicon particles reside under high shear conditions in the nitrogen or argon gas atmosphere. The high shear mixing can occur at approximately 1500 rpm for about 15 minutes at a temperature of about 25° C.

Further to the foregoing, it was discovered that the high shear mixing procedure(s) should occur under temperature controlled conditions, i.e., suitably cool(ed) conditions, to avoid over-heating the particles involved, which can give rise to an undesired level of silicon oxidation and the generation of silicon oxide(s). Individuals having ordinary skill in the relevant art will appreciate that the presence of silicon oxide(s) reduce the Coulombic efficiency of Li-ion battery anode material. Therefore, the high shear mixing procedure(s) should occur under appropriate temperature controlled conditions, e.g., cooled conditions at a temperature below approximately 25-40° C. In the aforementioned representative implementation, this was accomplished by cooling the high shear mixer with chilled water during the high shear mixing procedure.

A seventh process portion 140 involves adding or applying a source of amorphous carbon to the graphite particles carrying silicon nanostructures on their outer surfaces, which were obtained in association with or upon completion of the sixth process portion 135, and further adhering the silicon nanostructures to the graphite particles. The seventh process portion 140 is performed under an inert or essentially inert atmosphere, e.g., nitrogen or argon gas.

In multiple embodiments, the source of amorphous carbon includes or is pitch, and the seventh process portion 140 includes a pitch blending/mixing procedure 142 in which pitch is blended or mixed with the graphite particles carrying silicon nanostructures by way of a conventional mixer, typically under non-shear or low-shear conditions, to add, apply, combine, or blend pitch with these graphite-silicon nanostructure particles. In several embodiments in which the source of amorphous carbon includes or is pitch, the seventh process portion 140 further includes a kneading procedure 144. During the kneading procedure 144, the pitch-bearing graphite particles carrying silicon nanostructures, i.e., the graphite particles having silicon nanostructures as well as pitch on their outer surfaces, are kneaded by way of a conventional kneading machine in order to further physically associate, adhere, or bind the silicon nanostructures with the outer surfaces of the graphite particles, e.g., by way of pitch-enhanced or pitch-based adhesion of the silicon nanostructures to the outer surfaces of graphite particles. In a representative implementation, kneading occurs at approximately 80 rpm rotor speed, at a temperature of approximately 250° C. for about 2 hours. During the kneading procedure 144, the pitch particles soften or melt, and mechanical kneading causes softened/melted pitch to surround the silicon nanostructures carried on the outer surfaces of the graphite particles, thereby encasing the silicon nanostructures in melted pitch and aiding or furthering adhesion of the silicon nanostructures to the underlying graphite particles. After the kneading procedure 144, the pitch typically exists as a layer over the at least portions of the outer surfaces of the graphite particles, within which the silicon nanostructures are surrounded, embedded, encased, or encapsulated.

It can be noted that the mass or amount of pitch added to the graphite particles carrying silicon nanostructures depends upon the surface area of the graphite particles used in the fourth process portion 125. More specifically, the mass or amount of pitch added as part of the seventh process portion 140 increases with increasing graphite particle surface area. However, with respect to the addition of pitch, it was found that too little overall pitch mass subsequently gives rise to brittle anode material layers, and too much overall pitch mass reduces Li-ion battery anode capacity due to low anode capacity and Coulombic efficiency of amorphous carbon formed from pitch (and hence the overall mass Si nanostructures needs to increase in order to maintain high anode capacity as the overall mass of pitch increases). Individuals having ordinary skill in the relevant art will understand that overall pitch mass can be adjusted or varied in view of (a) graphite particle surface area, (b) anode structure resiliency/strength, and (c) an intended capacity.

An eighth process portion 145 involves performing a carbonization procedure upon the aforementioned graphite-silicon nanostructure particles to which the amorphous carbon source, e.g., pitch, has been added or combined. The carbonization procedure can involve heating the graphite-silicon nanostructure particles to which the amorphous carbon source, e.g., pitch, has been added in a furnace, e.g., a conventional furnace, at a temperature sufficient to generate a layer of amorphous carbon on the graphite-silicon nanostructure particles, e.g., between about 700-1000° C., or approximately 800° C. This layer of amorphous carbon at least partially covers the outer surfaces of the underlying graphite particles, and at least some (e.g., the majority, or nearly or essentially all) of the silicon nanostructures are embedded or encapsulated within the amorphous carbon layer. The carbonization procedure is performed under an inert or essentially inert atmosphere, e.g., nitrogen or argon gas.

After the carbonization procedure, in various embodiments the SCN particles exhibit an intended, target, or final mass ratio of graphite:silicon:amorphous carbon. In multiple embodiments, the target graphite:silicon:amorphous carbon ratio is approximately 70-90:5-20:5-20, e.g., approximately 80:10:10, in a manner that includes nonzero amounts of each of these constituents (i.e., silicon, graphite, and amorphous carbon) and which totals to 100% as individuals having ordinary skill in the relevant art will readily understand.

When the amorphous carbon source includes or is pitch, in association with the carbonization procedure, organic matter is burned out of the pitch, and the pitch can exhibit a significant mass loss relative to its the original or starting mass, e.g., a mass loss between approximately 20-60%, or approximately 40%, depending upon the specific chemical composition of the pitch used. Depending upon embodiment details, after the carbonization procedure, the target SCN composition ratio can be satisfied by adding excess pitch according to its mass loss.

In various embodiments, upon completion of the carbonization procedure each SCN particle exists as an inner or core graphite particle or graphite core that has a layer or matrix of amorphous carbon on its outer surface, which typically exhibits a thickness ranging between approximately 250-1500 nm, and which contains silicon nanostructures embedded or encased and distributed therein. The layer of amorphous carbon having silicon nanostructures embedded therein exists over at least portions of the outer surfaces of the core graphite particles, and this layer of amorphous carbon and the silicon nanostructures carried therein can at least partially fill-in at least some variations in the contours or topography of the outer surfaces of the graphite particles, e.g., in a somewhat, generally, approximately, or essentially conformal manner. For instance, after the eighth process portion 145, recesses or indentations in the outer surface of the graphite particles (e.g., which were intrinsically present on the graphite particles provided in the fourth process portion 125) can be at least partially overlaid or filled-in with a layer of amorphous carbon in which the aforementioned silicon nanostructures are embedded.

In several embodiments, the SCN particles have a mass ratio of graphite:silicon:amorphous carbon of approximately 70-90:5-20:5-20 to yield 100% mass with respect to nonzero amounts of each of these components, where the specific graphite:silicon:amorphous carbon mass ratio can vary depending upon embodiment details and/or an intended or target graphite:silicon:amorphous carbon mass ratio.

SCN particles produced in accordance with particular embodiments of the present disclosure can exhibit a mass ratio of carbon:silicon between approximately 95-80:5-20. Moreover, SCN particles produced in accordance with certain embodiments of the present disclosure can contain approximately 1.5-3.0% oxygen by Si oxidation. Graphite and amorphous carbon in SCN particles cannot be distinguished in the chemical analysis.

In various embodiments, many or the majority, nearly all, or essentially all of the silicon nanostructures within the amorphous carbon layer or matrix exhibit plate-like morphologies as set forth above. Moreover, after the carbonization procedure, in multiple embodiments silicon nanostructures within a random cross sectional slice or plane through the thickness of the amorphous carbon layer (e.g., for each SCN particle, a random cross sectional slice or plane taken along a direction from the outer surface of the SCN particle toward or to the outer surface of its core graphite particle, such as a direction approximately, nearly, or essentially normal or perpendicular to the outer surface and/or the centroid or center point of the core graphite particle) typically exhibit a median length, which defines their largest physical span or spatial extent, between approximately 50-300 nm, or between approximately 80-160 nm, e.g., approximately 100-140 nm, or approximately 120 nm; a median thickness between about 30-60 nm, e.g., approximately 45 nm; and a median exposed side surface area defined as length multiplied by thickness between approximately 2,400-9,600 $nm^2$, or approximately 5,400 $nm^2$ (e.g., between approximately 4,000-6,800 $nm^2$). Also, the silicon nanostructures typically internally exhibit grain sizes of between about 7-45 nm, e.g., approximately 10-30 nm.

Upon completion of the carbonization procedure, in various embodiments the SCN particles typically exhibit a median particle size of approximately 10-30 μm, e.g., approximately 15-25 μm. However, individuals having ordinary skill in the relevant art will appreciate that the SCN particle sizes exist within a particle size distribution, e.g., which includes particles larger than 25 μm.

A ninth process portion 150 involves controllably obtaining, providing, or producing SCN particles having an intended, target, or specific maximum particle size, e.g., for subsequent use in an anode material or material composition. The ninth process portion 150 can include a mild milling procedure (e.g., a low or very low energy milling procedure) and/or a sieving procedure, each of which is performed by way of conventional equipment, in a manner readily understood by individuals having ordinary skill in the relevant art. During the sieving procedure, SCN particles are sieved, such that SCN particles larger than a selected or predetermined median size, e.g., approximately 40 μm in diameter, are removed or excluded. In a representative implementation, the sieving procedure utilizes a 200 mesh sieve.

An tenth process portion 165 can involve inspecting, characterizing, and/or verifying certain material structural and/or compositional properties of the particulate SCN material, such as by way of one or more procedures directed to estimating, determining, or measuring such properties by way of (a) median particle size (e.g., D50) measurements; scanning electron microscopy (SEM); focused ion beam scanning electron microscopy (FIB-SEM); transmission electron microscopy (TEM); X-ray diffraction (XRD); and/or one or more other techniques, as will be readily understood by individuals having ordinary skill in the relevant art.

An eleventh process portion 160 can involve fabricating an anode or negative electrode structure, which can simply be referred to as an anode, which carries or contains an anode material or material composition or negative active material or material composition which includes SCN particles in accordance with an embodiment of the present disclosure. Depending upon embodiment details, particulate SCN material can be directly utilized in the anode, without combination with additional or secondary graphite particles; or the particulate SCN materials can be combined with additional or secondary graphite particles. In several embodiments, an anode carrying SCN particles in accordance with an embodiment of the present disclosure, in the absence of additional graphite particles blended therewith, provides a capacity of approximately 650 milliAmp hours per gram (mAhr/g).

In embodiments that include additional graphite particles, the additional graphite particles can be natural and/or synthetic graphite particles, but typically the additional graphite particles include or are synthetic graphite particles. Thus, in some embodiments, the eleventh process portion 160 includes a blending procedure in which SCN particles in powder form are blended with additional graphite particles (e.g., synthetic graphite particles having a median size of approximately 10-30 μm) in accordance with a predetermined SCN particle:graphite particle mass ratio, for instance, about 3%-25% SCN particles (e.g., approximately 15% SCN particles in one embodiment) to correspondingly about 75%-97% additional graphite particles (e.g., approximately 85% additional graphite particles in this specific embodiment), such that the total mass ratio of SCN particles:additional graphite particles is 100%. In such embodiments, a mass ratio of SCN particles:additional graphite particles can be approximately 5-25:75-95, e.g., approximately 10-20:80-90, or approximately 15:85.

In the anode, the aforementioned anode material or material composition resides in an anode material layer, in a manner readily understood by individuals having ordinary skill in the relevant art. The anode material layer may further include a binder, and optionally a conductive material. The anode material layer may include about 1 wt % to about 5 wt % of the binder based on the total weight of the anode material layer. In addition, when the anode material layer further includes a conductive material, it may include about 90 wt % to about 98 wt % of the anode material or anode material composition, about 1 wt % to about 5 wt % of the binder, and about 1 wt % to about 5 wt % of the conductive material.

The binder improves the binding properties of the SCN particles and additional graphite particles (if present) to each other and to a current collector. The binder may include a non-water-soluble binder, a water-soluble binder, or a combination thereof.

Nonlimiting representative examples of the non-water-soluble binder include polyvinylchloride, carboxylated polyvinylchloride, polyvinylfluoride, ethylene oxide-containing polymers, polyvinylpyrrolidone, polyurethane, polytetrafluoroethylene, polyvinylidene fluoride, polyethylene, polypropylene, polyamideimide, polyimide, and combinations thereof.

Nonlimiting representative examples of the water-soluble binder include styrene-butadiene rubbers, acrylated styrene-butadiene rubbers, polyvinyl alcohol, sodium polyacrylate, homopolymers or copolymers of propylene and a C2 to C8 olefin, copolymers of (meth)acrylic acid and (meth)acrylic acid alkyl ester, and combinations thereof.

When the water-soluble binder is used as an anode binder, a cellulose-based compound may be further used to provide viscosity. The cellulose-based compound may include one or more of carboxymethyl cellulose, hydroxypropylmethyl cellulose, methyl cellulose, or alkaline metal salts thereof. The alkaline metal may be sodium (Na), potassium (K), or lithium (Li). The cellulose-based compound may be included in an amount of 0.1 to 3 parts by weight based on 100 parts by weight of the binder.

As for the conductive material that may be present in the anode material layer, essentially any electro-conductive material that does not cause a chemical change may be used. Non-limiting representative examples of the conductive material include carbon-based materials (such as natural graphite, artificial graphite, carbon black, acetylene black, ketjen black, carbon fibers, and carbon nanotubes), metal-based materials (such as metal powders or metal fibers including copper, nickel, aluminum, and silver), conductive polymers (such as polyphenylene derivatives), and mixtures thereof.

The current collector may include a copper foil, a nickel foil, a stainless steel foil, a titanium foil, a nickel foam, a copper foam, a polymer substrate coated with a conductive metal, or combinations thereof.

In view of the foregoing, in several embodiments SCN particles and additional graphite particles can be combined in a conventional liquid carrier to form an anode slurry with about 1-5 wt % of binder based on the total weight of anode active material layer, which can be applied to or coated on a conductive foil (e.g., copper foil), in a manner readily understood by individuals having ordinary skill in the relevant art, thereby forming the anode.

A twelfth process portion 165 can involve fabricating a lithium ion electrochemical cell (e.g., a half cell, a coin cell, or a pouch cell) or a lithium ion battery structure or battery having an anode in accordance with an embodiment of the present disclosure, and testing or using the electrochemical cell or lithium ion battery. The twelfth process portion 165 can include an electrochemical cell or lithium ion battery fabrication and assembly procedure in which the anode produced by way of the eleventh process portion 160 is incorporated into an electrochemical cell or a lithium ion battery, respectively. The electrochemical cell or lithium ion battery includes an electrolyte or electrolyte composition (e.g., a conventional non-aqueous electrolyte, or in certain embodiments an inorganic solid state electrolyte (SSE)) in a manner readily understood by individuals having ordinary skill in the art, and with respect to complete electrochemical cells or lithium ion batteries further includes a cathode or positive electrode structure (e.g., a conventional cathode carrying a cathode material or material composition in a cathode material layer), and a separator structure or separator (e.g., a conventional separator), as also readily understood by individuals having ordinary skill in the relevant art. In several embodiments, an electrochemical cell or lithium ion battery in accordance with an embodiment of the present disclosure has an areal capacity ratio of negative electrode(s) to positive electrode(s) between approximately 1.01-1.10.

An anode that carries particulate SCN material in accordance with an embodiment of the present disclosure can function with a wide variety of electrolytes or electrolyte compositions suitable for use in lithium ion batteries, a wide variety of cathode structures and cathode materials suitable for use in lithium ion batteries, and a wide variety of separator structures or separators suitable for use in lithium ion batteries. For instance, suitable electrolytes, cathode materials, and separators are disclosed in U.S. Pat. No. 9,876,221, which is incorporated herein by reference in its entirety.

More particularly, a non-aqueous electrolyte may include a non-aqueous organic solvent and a lithium salt. The non-aqueous organic solvent serves as a medium for transmitting ions taking part in the electrochemical reaction of the battery. The non-aqueous organic solvent may include a carbonate-based, ester-based, ether-based, ketone-based, alcohol-based, or aprotic solvent.

Nonlimiting representative examples of carbonate-based solvents include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate BC), and the like.

Nonlimiting representative examples of ester-based solvents include methyl acetate, ethyl acetate, n-propyl acetate, methylpropionate, ethylpropionate, γ-butyrolactone, decanolide, valerolactone, mevalonolactone, caprolactone, and the like.

Nonlimiting representative examples of ether-based solvents include dibutyl ether, tetraglyme, diglyme, dimethoxyethane, 2-methyltetrahydrofuran, tetrahydrofuran, and the like.

Nonlimiting representative examples of ketone-based solvents include cyclohexanone and the like.

Nonlimiting representative examples of alcohol-based solvents include ethyl alcohol, isopropyl alcohol, and the like.

Nonlimiting representative examples of aprotic solvents include nitriles (such as R—CN where R is a C2 to C20 linear, branched, or cyclic hydrocarbon-based moiety and may include a double bond, an aromatic ring, or an ether bond), amides (such as dimethylformamide), dioxolanes (such as 1,3-dioxolane), sulfolanes, and the like.

A single non-aqueous organic solvent or a mixture of solvents may be used. When the organic solvent is a mixture, the mixture ratio can be adjusted in accordance with intended or target battery performance.

The carbonate-based solvent may include a mixture of a cyclic carbonate and a chain (linear or branched) carbonate. The cyclic carbonate and the chain carbonate may be mixed together in a volume ratio of about 1:1 to about 1:9. When the mixture is used as the non-aqueous organic solvent, the electrolyte performance may be enhanced.

In addition, the non-aqueous organic electrolyte may further include mixtures of carbonate-based solvents and aromatic hydrocarbon-based solvents. The carbonate-based solvents and the aromatic hydrocarbon-based solvents may be mixed together in a volume ratio of about 1:1 to about 30:1.

The aromatic hydrocarbon-based organic solvent may be represented by the following Chemical Formula 1.

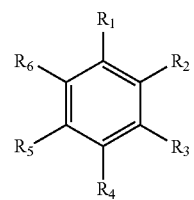

Chemical Formula 1

In Chemical Formula 1, each of $R_1$ to $R_6$ is independently selected from hydrogen, halogens, C1 to C10 alkyl groups, C1 to C10 haloalkyl groups, and combinations thereof.

Nonlimiting representative examples of the aromatic hydrocarbon-based organic solvent include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and combinations thereof.

The non-aqueous electrolyte may further include a material selected from vinylene carbonate, ethylene carbonate-based compounds of the following Chemical Formula 2, and combinations thereof.

Chemical Formula 2

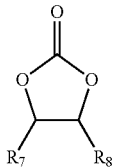

In Chemical Formula 2, $R_7$ and $R_8$ are the same or different, and each is independently selected from hydrogen, halogens, cyano groups (CN), nitro groups ($NO_2$), and C1 to C5 fluoroalkyl groups, provided that at least one of $R_7$ and $R_8$ is not hydrogen, i.e., at least one of $R_7$ and $R_8$ is selected from halogens, cyano groups (CN), nitro groups ($NO_2$), and C1 to C5 fluoroalkyl groups.

Nonlimiting representative examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like.

The material selected from vinylene carbonate, ethylene carbonate-based compounds of Chemical Formula 2, and combinations thereof may be included in the electrolyte in an amount of about 15 to about 30 volume % based on the entire amount of the non-aqueous electrolyte solvent.

The lithium salt supplies the lithium ions in the battery, enables the basic operation of the rechargeable lithium battery, and improves lithium ion transport between the positive and negative electrodes. Nonlimiting representative examples of the lithium salt include supporting salts selected from $LiPF_6$, $LiBF_4$, $LiSbF_6$, $LiAsF_6$, $LiN(SO_2C_2F_5)_2$, $Li(CF_3SO_2)_2N$, $LiC_2F_5SO_3$, $LiC_4F_9SO_3$, $LiClO_4$, $LiAlO_2$, $LiAlCl_4$), $LiN(C_xF_{2x+1}SO_2)(C_yF_{2y+1}SO_2)$ (where x and y are natural numbers), LiCl, LiI, $LiIB(C_2O_4)_2$ (lithium bisoxalato borate, LiBOB), and combinations thereof. The lithium salt may be used at a concentration of about 0.1 M to about 2.0 M. When the lithium salt is included at a concentration within this range, electrolyte performance and lithium ion mobility may be enhanced due to optimal electrolyte conductivity and viscosity.

With respect to the cathode material, it may include a lithiated intercalation compound that reversibly intercalates and deintercalates lithium ions. The cathode material may include a composite oxide including at least one selected from cobalt, manganese, and nickel, as well as lithium. In particular, the following compounds may be used:

$Li_aA_{1-b}X_bD_2$ ($0.90 \le a \le 1.8$, $0 \le b \le 0.5$)
$Li_aA_{1-b}X_bO_{2-c}D_c$ ($0.90 \le a \le 1.8$, $0 \le c \le 0.05$)
$Li_aE_{1-b}X_bO_{2-c}D_c$ ($0 \le b \le 0.5$, $0 \le c \le 0.05$)
$Li_aE_{2-b}X_bO_{4-c}D_c$ ($0 \le b \le 0.5$, $0 \le c \le 0.05$)
$Li_aNi_{1-b-c}Co_bX_cD_\alpha$ ($0.90 \le a \le 1.8$, $0 \le b \le 0.5$, $0 \le c \le 0.05$, $0 < \alpha \le 2$)
$Li_aNi_{1-b-c}Co_bX_cO_{2-\alpha}T_\alpha$ ($0.90 \le a \le 1.8$, $0 \le b \le 0.5$, $0 \le c \le 0.05$, $0 < \alpha < 2$)
$Li_aNi_{1-b-c}Co_bX_cO_{2-\alpha}T_2$ ($0.90 \le a \le 1.8$, $0 \le b \le 0.5$, $0 \le c \le 0.05$, $0 < \alpha < 2$)
$Li_aNi_{1-b-c}Mn_bX_cD_\alpha$ ($0.90 \le a \le 1.8$, $0 \le b \le 0.5$, $0 \le c \le 0.05$, $0 < \alpha \le 2$)
$Li_aNi_{1-b-c}Mb_bX_cO_{2-\alpha}T_\alpha$ ($0.90 \le a \le 1.8$, $0 \le b \le 0.5$, $0 \le c \le 0.05$, $0 < \alpha < 2$)
$Li_aNi_{1-b-c}Mn_bX_cO_{2-\alpha}T_2$ ($0.90 \le a \le 1.8$, $0 \le b \le 0.5$, $0 \le c \le 0.05$, $0 < \alpha < 2$)
$Li_aNi_bE_cG_dO_2$ ($0.90 \le a \le 1.8$, $0 \le b \le 0.9$, $0 \le c \le 0.05$, $0.001 < d \le 0.1$)
$Li_aNi_bCo_cMn_dG_eO_2$ ($0.90 \le a \le 1.8$, $0 \le b \le 0.9$, $0 \le c \le 0.05$, $0 \le d \le 0.5$, $0.001 \le e \le 0.1$)
$Li_aNiG_bO_2$ ($0.90 \le a \le 1.8$, $0.001 \le b \le 0.1$; $Li_aCoG_bO_2$ ($0.9 \le a \le 1.8$, $0.001 \le b \le 0.1$)
$Li_aMn_{1-b}G_bO_2$ ($0.90 \le a \le 1.8$, $0.001 \le b \le 0.1$)
$Li_aMn_2G_bO_4$ ($0.90 \le a \le 1.8$, $0.001 \le b \le 0.1$)
$Li_aMn_{1-g}G_gPO_4$ ($0.90 \le a \le 1.8$, $0 \le b \le 0.5$)
$QO_2$
$QS_2$
$LiQS_2$
$V_2O_5$
$LiV_2O_5$
$LiZO_2$
$LiNiVO_4$
$Li_{(3-f)}J_2(PO_4)_3 (0 \le f \le 2)$
$Li_{(3-f)}Fe_2(PO_4)_3 (0 \le f \le 2)$
$LiFePO_4$ In the above formulas, A may be selected from Ni, Co, Mn, and combinations thereof. X may be selected from Al, Ni, Co, Mn, Cr, Fe, Mg, Sr, V, rare earth elements, and combinations thereof. D may be selected from O, F, S, P, and combinations thereof. E may be selected from Co, Mn, and combinations thereof. T may be selected from F, S, P, and combinations thereof. G may be selected from Al, Cr, Mn, Fe, Mg, La, Ce, Sr, V, and combinations thereof. Q may be selected from Ti, Mo, Mn, and combinations thereof. Z may be selected from Cr, V, Fe, Sc, Y, and combinations thereof. J may be selected from V, Cr, Mn, Co, Ni, Cu, and combinations thereof.

The lithium-containing compound may have a coating layer on its surface, or may be mixed with another compound having a coating layer. The coating layer may include at least one coating element compound selected from oxides of a coating element, hydroxides of a coating element, oxyhydroxides of a coating element, oxycarbonates of a coating element, and hydroxyl carbonates of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be formed by essentially any process so long as the process does not adversely influence the properties of the cathode material. For example, the process may include any coating method such as spray coating, dipping, and the like.

The cathode material may be present in an amount of about 90 to about 98 wt % based on the total weight of cathode material layer.

The cathode material layer may also include a binder and a conductive material. Each of the binder and the conductive material may be included in an amount of about 1 to about 5 wt % based on the total weight of the cathode material layer.

The binder improves the binding properties of the cathode material particles to each other, and also to the current collector. Nonlimiting representative examples of the binder include polyvinyl alcohol, carboxymethyl cellulose, hydroxypropyl cellulose, diacetyl cellulose, polyvinyl chloride, carboxylated polyvinyl chloride, polyvinylfluoride, ethylene oxide-containing polymers, polyvinylpyrrolidone, polyurethane, polytetrafluoroethylene, polyvinylidene fluoride, polyethylene, polypropylene, styrene-butadiene rubbers, acrylated styrene-butadiene rubbers, epoxy resins, nylon, and the like.

A conductive material may be included in the cathode material layer to improve electrode conductivity. Essentially any electrically conductive material may be used as the conductive material so long as it does not cause a chemical change. Nonlimiting representative examples of the conductive material include natural graphite, artificial graphite, carbon black, acetylene black, ketjen black, carbon fibers, carbon nanotubes, metal powders or metal fibers (including copper, nickel, aluminum, silver, and the like), polyphenylene derivatives, and combinations thereof.

The current collector may be aluminum (Al) but is not limited thereto.

A separator may reside between the anode or negative electrode and the cathode or positive electrode, as needed. Nonlimiting representative examples of suitable separator materials include polyethylene, polypropylene, polyvinylidene fluoride, and multi-layers thereof (such as, but not limited to, polyethylene/polypropylene double-layered separators, polyethylene/polypropylene/polyethylene triple-layered separators, and polypropylene/polyethylene/polypropylene triple-layered separators).

In embodiments that are based on an inorganic SSE, the lithium ion battery and the electrolyte thereof can be based on or correspond to a lithium—sulfur (Li—S) battery of a type described in "Progress of the Interface Design in All-Solid-State Li—S Batteries," Junpei Yue et al., *Advanced Functional Materials* (www.afm-journal.de), 2018, 28, 1707533 (DOI: 10.1002/adfm. 201707533), where the anode material layer or anode electrode thereof carries or contains Si nanostructures in accordance with an embodiment of the present disclosure, e.g., within SCN particles where at least some of the silicon nanostructures exhibit plate-like morphologies in a manner described herein.

Figure 2A:
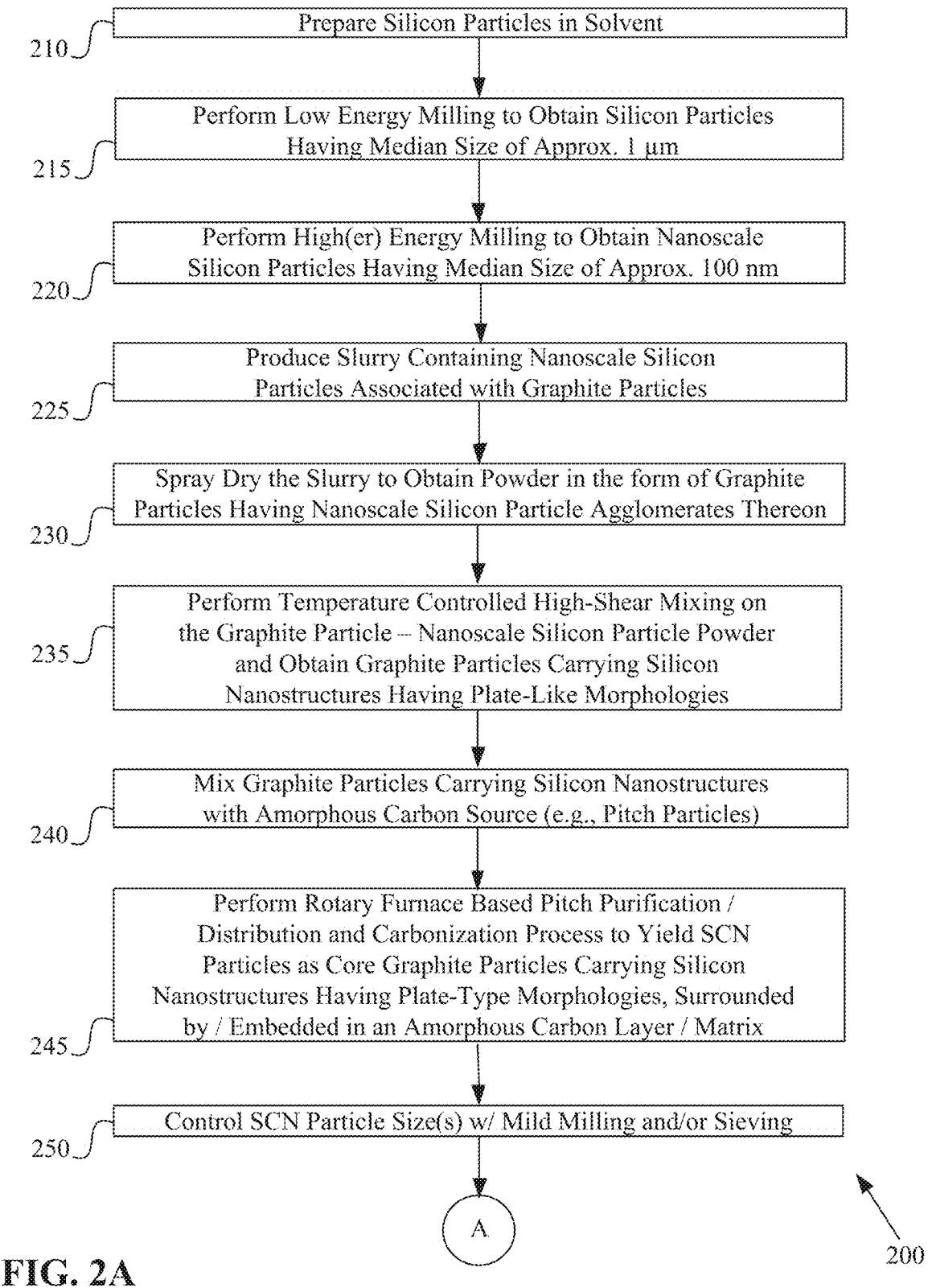
FIGS. 2A-2B are a flow diagram of a second process for producing a particulate SCN material, characterizing and testing aspects of the particulate SCN material, and using the particulate SCN material as an anode material or negative active material in an anode structure in accordance with an embodiment of the present disclosure.
Figure 2B:
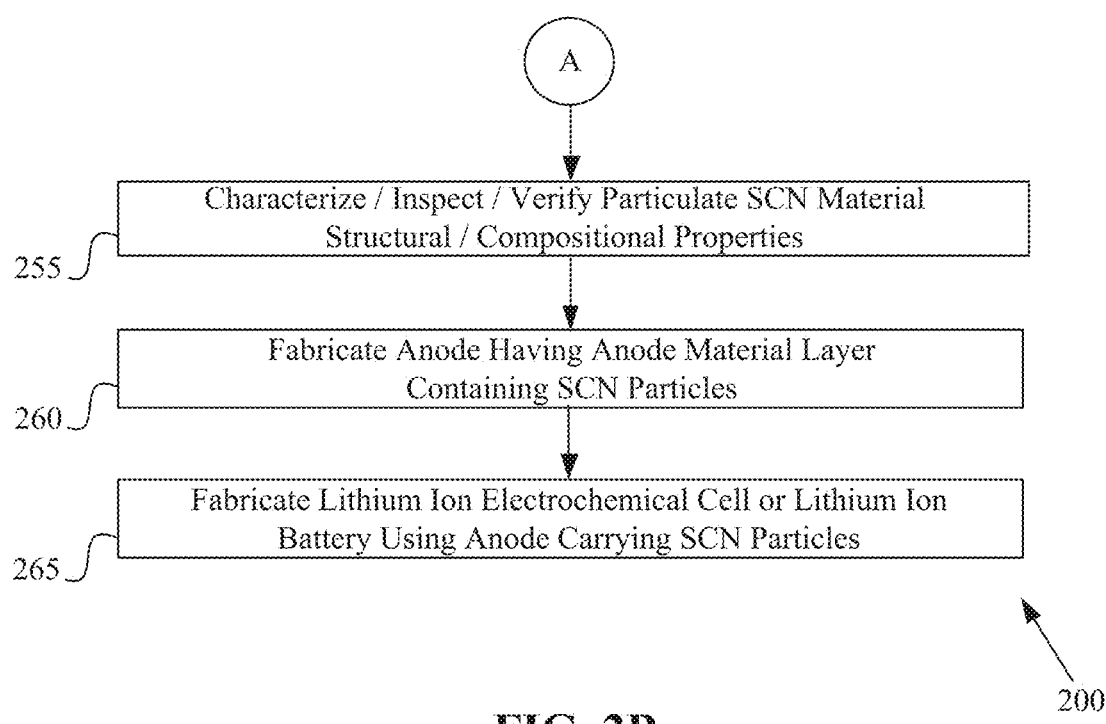

FIGS. 2A-2B are a flow diagram of a second process 200 for producing a particulate SCN characterizing and testing aspects of the particulate SCN material, and using the particulate SCN material as an anode material or negative active material in an anode structure in accordance with particular embodiments of the present disclosure. The second process 200 includes a first process portion 205 through a twelfth process portion 265 in a manner that similar or generally analogous to the first process 100 described above with reference to FIGS. 1A-1B. In several embodiments, the first through sixth process portions 205-235 and ninth through twelfth process portions 250-265 of the second process 200 of FIGS. 2A-2B are analogous, essentially identical, or identical to the corollary, counterpart, or corresponding first through sixth process portions 105-135 and ninth through twelfth process portions 150-165 of the first process of FIGS. 1A-1B. Thus, for purpose of brevity, the first through sixth process portions 205-235 and ninth through twelfth process portions 250-265 of the second process 200 of FIGS. 2A-2B are not described again (e.g., individuals having ordinary skill in the art can refer to the corollary, counterpart, or corresponding process portions 105-135 and 150-165 of FIGS. 1A-1B). However, in the second process 200 of FIGS. 2A-2B, the details of the seventh and eighth process portions 240, 245 differ relative to the details of the seventh and eighth process portions 140, 145 of the first process 100 of FIGS. 1A-1B, as detailed hereafter.

In the second process 200, the seventh process portion 245 involves combining the graphite particles that carry the silicon nanostructures on outer surfaces thereof with a source material or material composition that can provide or be converted to amorphous carbon under an inert or essentially inert atmosphere, where the amorphous carbon source material includes or is solid pitch particles, e.g., pitch that exists in solid particulate form at room temperature and having a median particle size of approximately 5 μm and a softening or melting point between approximately 210-250° C. The solid pitch particles can be added (e.g., progressively added) to the graphite particles carrying the silicon nanostructures during a mixing procedure that utilizes a conventional mixer under non-shear or very low/minimal shear conditions.

In the second process 200, the eighth process portion 245 involves each of (1) a pitch purification and distribution procedure, and (2) a carbonization procedure. In various embodiments, the pitch purification and distribution procedure and the carbonization procedure occur in a unified or combined manner in a rotary furnace, under an inert or essentially inert atmosphere such as nitrogen or argon gas.

During the pitch purification and distribution procedure, the pitch particles that were mixed with the graphite particles carrying silicon nanostructures are softened and/or melted at a temperature sufficient to remove at least some impurities (e.g., organic matter/volatile organic compounds); and the softened/melted pitch is further distributed (e.g., more uniformly or generally uniformly distributed) over the surfaces of the graphite particles to form a layer of pitch that overlays or surrounds the graphite particles, and within which the silicon nanostructures are surrounded, embedded, encased, or encapsulated. Because the silicon nanostructures are encased in the layer of pitch, the silicon nanostructures are further adhered to the outer surfaces of their underlying graphite particles.

During the carbonization procedure, the aforementioned layer of pitch is transformed into amorphous carbon under an inert or essentially inert atmosphere to achieve, obtain, or produce SCN material particles in powder form, such that the SCN particles exhibit an intended, target, or final mass ratio of silicon:graphite:amorphous carbon, such as described above.

The pitch purification and distribution procedure and the carbonization procedure can occur by way of a conventional rotary furnace. In such an implementation, the rotary furnace is operated at approximately 5 rpm, in association with a multi-stage temperature sequence or profile, e.g., having the following stages:

(a) ramp up temperature from ambient temperature at a rate of approximately 3-5° C./minute;
(b) maintain temperature at approximately 120° C. for 2 hours to remove moisture;
(c) ramp up temperature at a rate of approximately 3-5° C./minute;
(d) maintain temperature at approximately 250° C. for 2 hours to remove impurities (e.g., organic matter/volatile organic compounds);
(e) ramp up temperature at a rate of approximately 3-5° C./minute;
(f) maintain temperature between approximately 700-1000° C. for a sufficient/predetermined time period, e.g., at approximately 800° C. for 2 hours, to create a layer or matrix of amorphous carbon surrounding each graphite particle, in which silicon nanostructures are embedded; and (g) allow the furnace and its contents to cool (e.g., to approximately room temperature) while continuing furnace rotation.

Individuals having ordinary skill in the relevant art will understand that the temperature in stage (d) above (e.g., approximately 250° C. in various embodiments) is sufficient to remove impurities as well as soften and/or melt the pitch particles that were mixed with the core graphite particles having silicon nanostructures thereon. In combination with such pitch particle softening/melting, the rotational motion of the furnace within, across, or throughout the duration of stage (d) above is sufficient to further mix and/or possibly knead softened/melted pitch with the graphite particles and silicon nanostructures, thereby further physically associating, adhering, or binding the silicon nanostructures with the outer surfaces of the graphite particles, e.g., by way of pitch-enhanced or pitch-based adhesion of the silicon nanostructures to the outer surfaces of graphite particles. Such mixing/kneading produces the aforementioned layer of pitch that overlays or surrounds the graphite particles, and within which the silicon nanostructures are surrounded, embedded, encased, or encapsulated. Thus, during stage (d) above, the pitch particles soften and/or melt, and mechanical mixing/kneading caused by way of furnace rotation causes softened/melted pitch to further surround the silicon nanostructures carried on the outer surfaces of the graphite particles, thereby encasing the silicon nanostructures in melted pitch and enhancing adhesion of the silicon nanostructures to the underlying graphite particles. After stage (d) above, pitch exists as a layer over the at least portions of the outer surfaces of the graphite particles, and the pitch overlays or surrounds the silicon nanostructures carried by such graphite particle outer surfaces.

It can be further noted that in certain embodiments in accordance with the present disclosure, a separate pitch particle kneading process can optionally be performed after the seventh process portion 240 and prior to an eighth process portion 245 of the second process 200, in a manner similar, generally analogous, essentially identical, or identical to that described above within the first process 100.

With reference to the carbonization procedure within the second process 200, during stage (f) above organic matter is burned out of the pitch that overlays and/or surrounds the silicon nanostructures and the graphite particles. Consequently, the pitch is transformed into amorphous carbon, such that each graphite particle and the silicon nanostructures carried thereby are surrounded or encased in an amorphous carbon layer or matrix. As indicated above, in association with such carbonization as organic matter is burned out, in several embodiments the pitch can exhibit a significant mass loss relative to the original or starting mass of the pitch particles, which can be taken into consideration to produce SCN particles having an intended carbon content.

EXAMPLE 1

SCN Particle Production and Characteristics

A solvent carrying crystalline silicon particles that were at least 99% pure was formed as set forth above in the first process portion 110 by combining source silicon particles in powder form with isopropyl alcohol (IPA) in a mass ratio of approximately 1:2. The silicon particles used as a raw material prior to introducing them into the IPA were at least approximately or generally spheroidal crystalline particles with a median particle size of approximately 5 µm.

The source silicon particles in solvent were then premilled by way of an attrition milling procedure as set forth above in the second process portion 115; and further subjected to a high energy milling procedure by way of a two stage bead milling procedure as set forth above in the third process portion 120 to produce silicon nanoparticles, or nanoscale silicon particles, in solvent where the nanoscale silicon particles exhibited a mean diameter (e.g., D50) of approximately 100 nm.

Figure 3A:
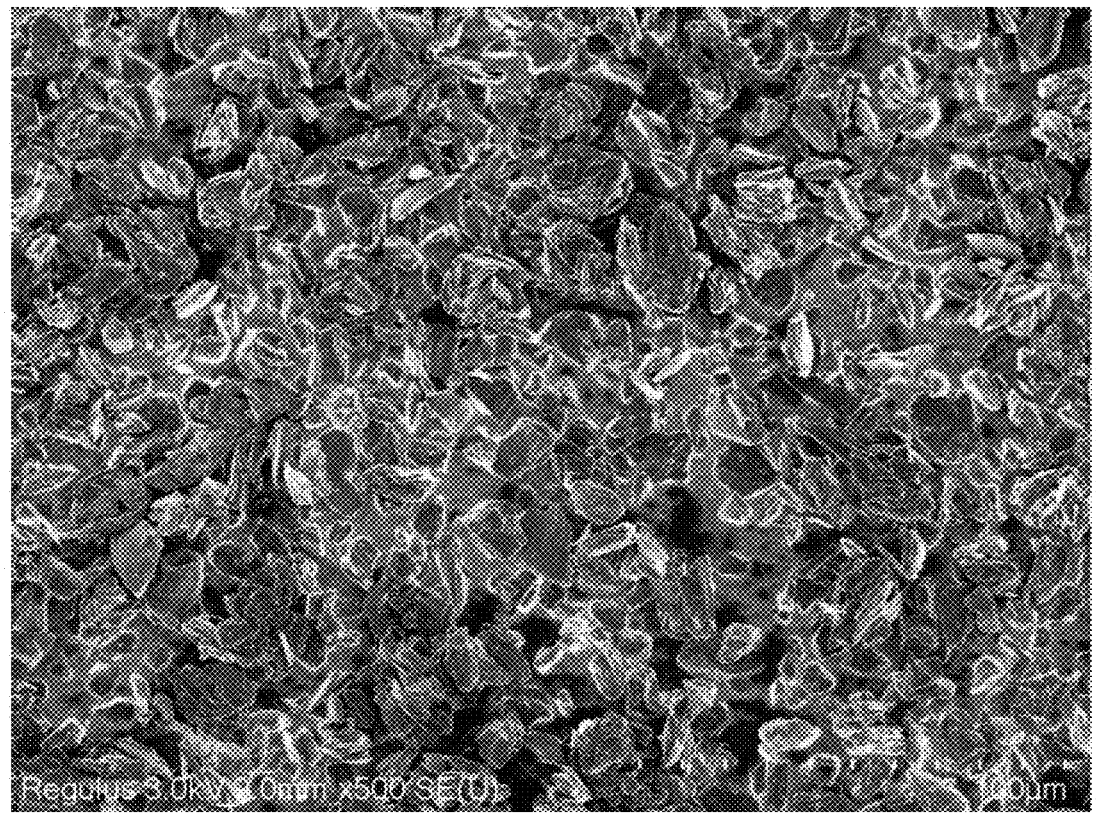
FIG. 3A is a Scanning Electron Microscope (SEM) secondary electron (SE) detection mode image of representative source irregular synthetic graphite particles used in the preparation or production of particulate SCN material in accordance with an embodiment of the present disclosure, corresponding to Example 1 described below.
Figure 3B:
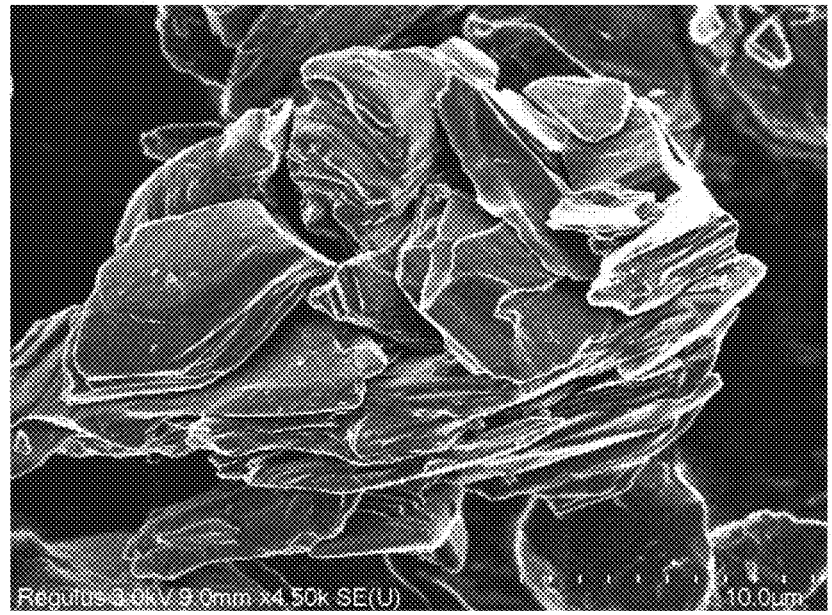
FIGS. 3B and 3C are further SE SEM images of particular source irregular synthetic graphite particles corresponding to FIG. 3A, indicating that these graphite particles can aggregate particulate form, and/or in unitary or separate/isolated particulate form.
Figure 3C:
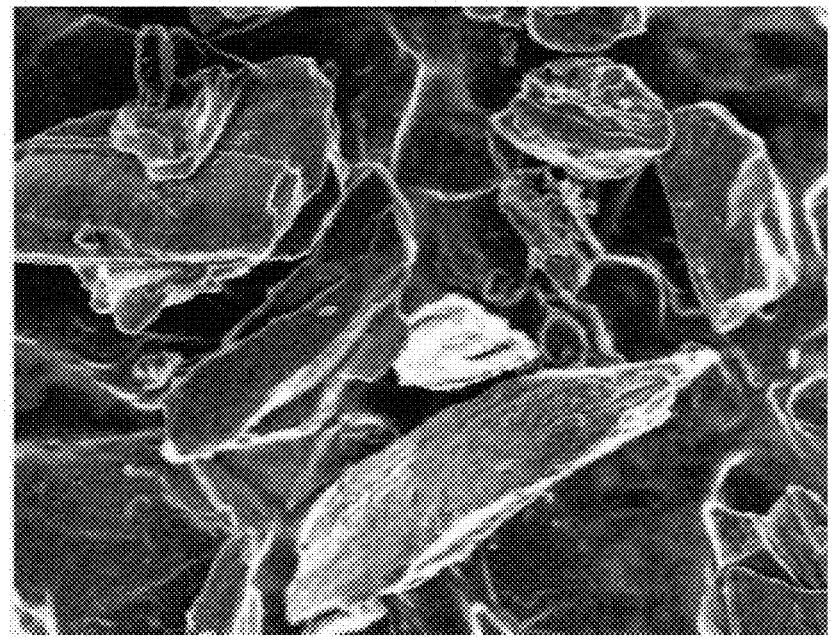

Source graphite particles in the form of irregular synthetic graphite particles having a median particle size between about 15-25 µm, e.g., approximately 20 µm, and PVA binder were then combined and mixed with the nanoscale silicon particles in solvent to form a slurry in which the nanoscale silicon particles were physically associated with, coupled to, or carried by the graphite particles, as set forth above in the fourth process portion 125. A sample of representative source irregular synthetic graphite particles used in the fourth process portion 125 for Example 1 are shown in the secondary electron detection mode (SE) SEM image of FIG. 3A. Such source graphite particles can exist in aggregates particulate form, and/or in unitary or separate/isolated particulate form, as respectively shown in the SE SEM images of FIGS. 3B-3C. For Example 1, the graphite particle-nanoscale silicon particle slurry produced by way of the fourth process portion 125 had a solids content of approximately 30%.

Figure 4A:
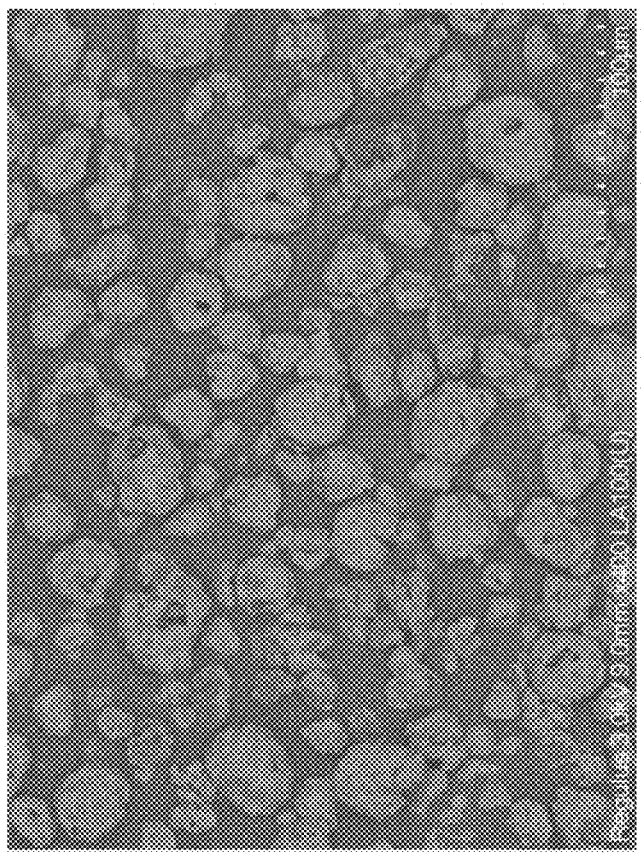
FIGS. 4A-4B are SE and backscattered electron (BSE) detection mode SEM images, respectively, showing nanoscale silicon particles attached to surfaces of graphite particles after a spray drying procedure in association with or during an SCN particle production process in accordance with an embodiment of the present disclosure, corresponding to Example 1.
Figure 4B:
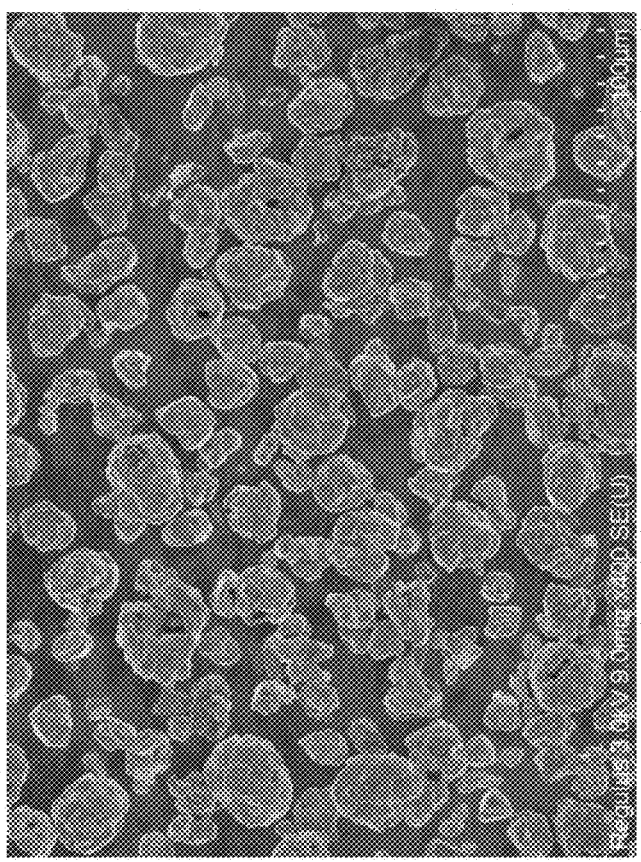

The slurry was then spray dried as set forth above in the fifth process portion 130 to produce a powder in the form of graphite particles having nanoscale silicon particles distributed on the outer surfaces thereof, i.e., inner, underlying, or core graphite particles carrying nanoscale silicon particles on their outer surfaces. FIGS. 4A-4B are SE SEM and backscatter emission (BSE) SEM images, respectively, of particles within a representative sample of the spray dried graphite-nanoscale silicon powder, showing nanoscale silicon particles attached to the outer surfaces of core graphite particles after spray drying. As indicated in FIGS. 4A-4B, after spray drying, the core graphite particles had nanoscale silicon particles carried or distributed on their outer surfaces in a generally uniform, nearly uniform, reasonably/suitably homogenous, or nearly homogenous manner.

The powder in the form of graphite particles having nanoscale silicon particles distributed on their outer surfaces was then subjected to a high shear mixing procedure in accordance with the sixth process portion 135 in a manner set forth above, by way of which the nanoscale silicon particles were further distributed or spread across the outer surfaces of the graphite particles, and the nanoscale silicon particles were physically modified or transformed, or further physically modified or transformed, by way of shearing forces produced during the high shear mixing procedure (e.g., as a result of impact forces). More specifically, by way of the high shear mixing procedure, the nanoscale silicon particles were simultaneously (a) further or more uniformly distributed on the outer surfaces of their underlying graphite particles; and (b) physically modified or transformed, or further physically modified or transformed, into silicon nanostructures as described above, such that they exhibited plate-like or more plate-like morphologies. After the sixth process portion 135 for Example 1, many or the majority or nearly or essentially all of the silicon nanostructures distributed on the outer surfaces of the core graphite particles exhibited plate-like morphologies.

After the high shear mixing procedure, pitch particles pitch in particulate form at room temperature) were combined and mixed with such core graphite-silicon nanostructure particles, i.e., the core graphite particles having silicon nanostructures distributed on their outer surfaces, as set forth above in the seventh process portion 140.

Figures 5A, 5B:
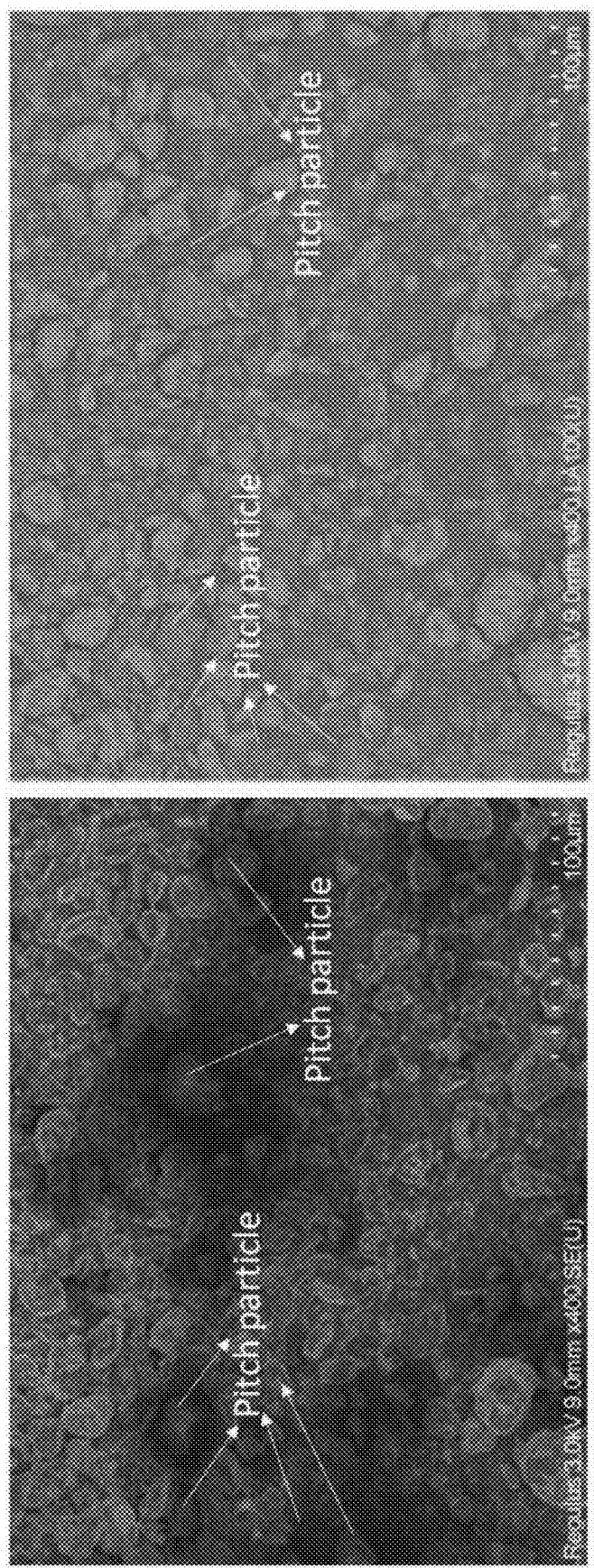
FIGS. 5A-5B are SE SEM and BSE SEM images, respectively, showing a representative sample of core graphite particles carrying silicon nanostructures after mixing pitch particles therewith in accordance with an embodiment of the present disclosure, corresponding to Example 1.

FIG. 5A is an SE SEM image and FIG. 5B is a corresponding BSE SEM image showing a representative sample of graphite particles carrying silicon nanostructures thereon (e.g., core graphite particles having silicon nanostructures adhered to their outer surfaces) after having been mixed with pitch particles. The darker or darkest areas or regions in the SE SEM image of FIG. 5A indicate or correspond to pitch particles that have been electrically charged up during SE SEM imaging due to low pitch particle conductivity, in a manner readily understood by individuals having ordinary skill in the relevant art.

The core graphite particles carrying silicon nanostructures and pitch particles thereon were next subjected to a rotary furnace based pitch purification and distribution procedure and carbonization procedure as set forth above in the eighth process portion 145 to produce SCN particles. The SCN particles were then subjected to a sieving procedure as set forth above in the ninth process portion 150.

Figure 6B:
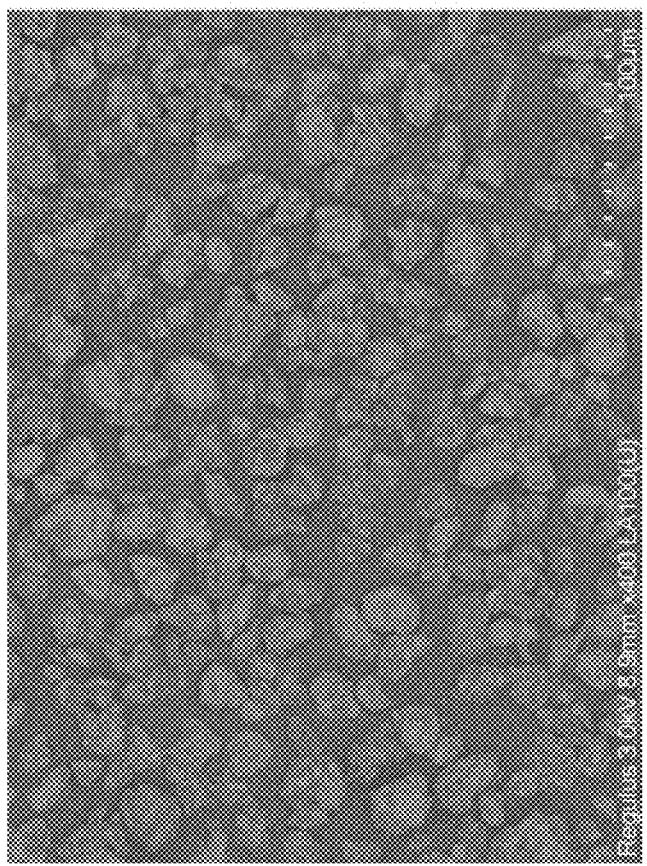
FIGS. 6A-6B are SE SEM and BSE SEM images, respectively, showing a representative sample of SCN particles produced in accordance with an embodiment of the present disclosure, corresponding to Example 1.
Figure 6A:
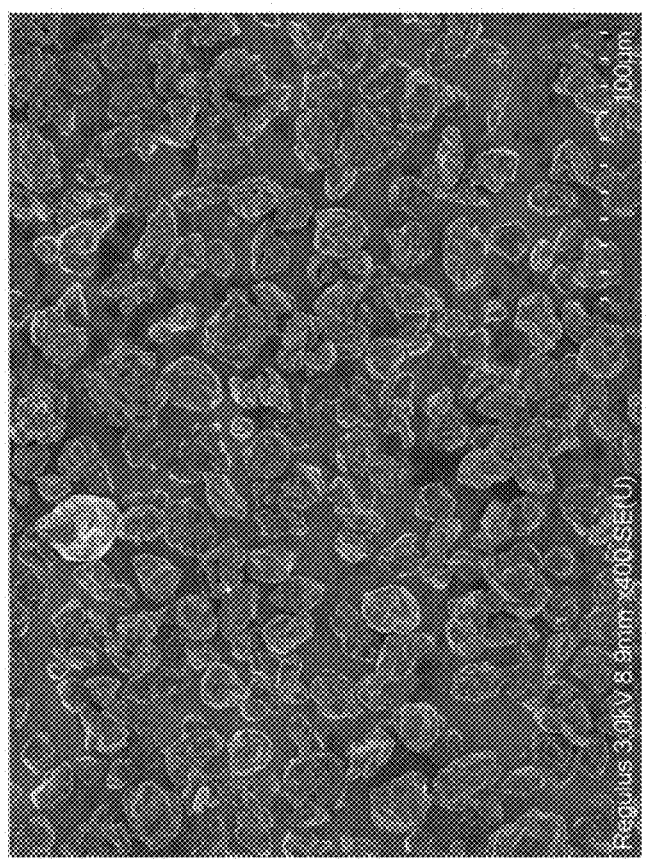

FIGS. 6A-6B are SE SEM and BS SEM images, respectively, showing a representative sample of SCN particles for Example 1, after the aforementioned sieving. As indicated in FIGS. 6A-6B, these SCN particles exhibited a generally uniform, nearly uniform, reasonably/suitably homogenous, or nearly homogeneous amorphous carbon layer thereon.

Figure 7:
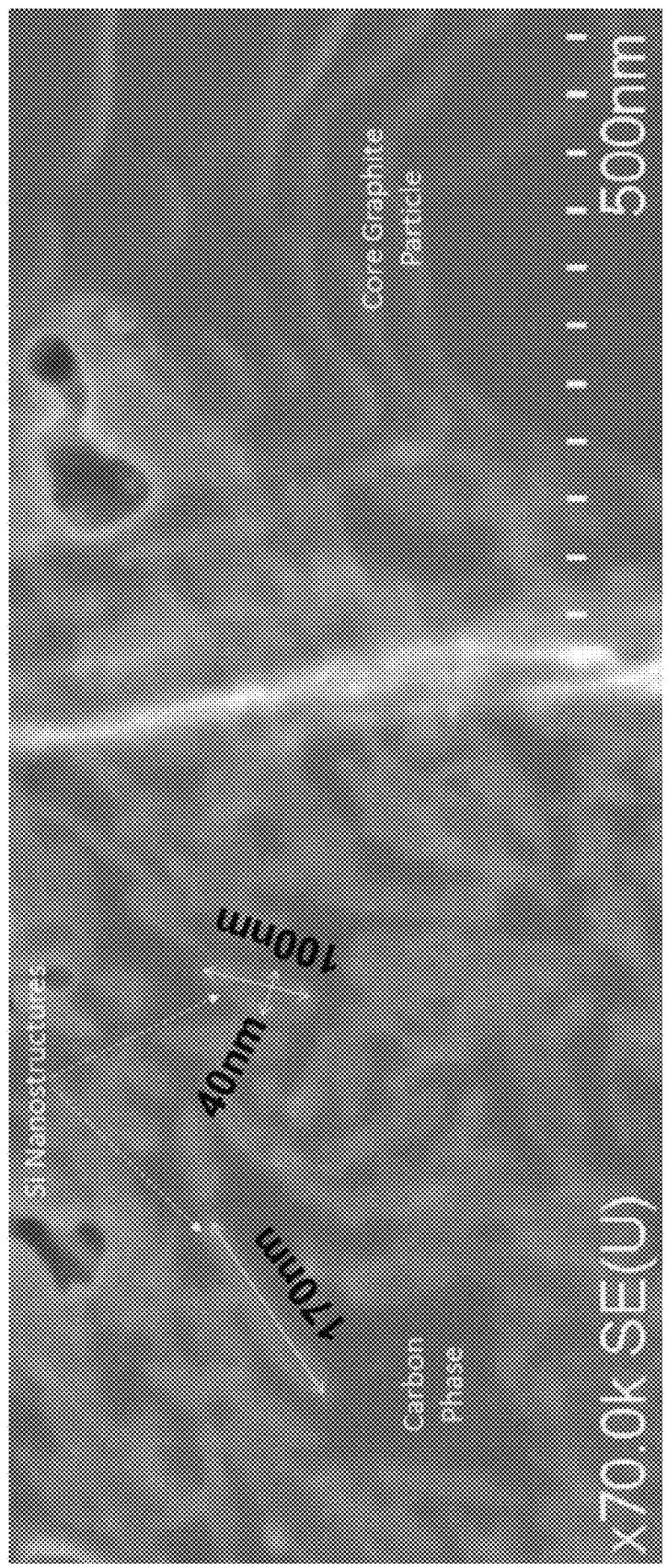
FIG. 7 is an SE SEM image showing portions of a representative sample SCN particle produced for Example 1, showing that such portions of the SCN particle existed as a core graphite particle covered by an amorphous carbon layer that contained, surrounded, or encapsulated silicon nanostructures therein, including silicon nanostructures having plate-like morphologies.

FIG. 7 is an SE SEM image showing portions of a representative sample SCN particle produced for Example 1. As indicated in FIG. 7, such portions of the SCN particle existed as a core graphite particle covered by an amorphous carbon layer that contained, surrounded, or encapsulated silicon nanostructures therein. Such silicon nanostructures included various silicon nanostructures having plate-like morphologies, including bar-like/bar shaped/rod-like/rod shaped morphologies (e.g., as silicon nanobars or nanorods). A first representative silicon nanostructure identified in FIG. 7 exhibited a length of approximately 170 nm, and a thickness significantly or very significantly smaller than its length of 170 nm; and a second representative silicon nanostructure identified in FIG. 7 exhibited a length of approximately 100 nm, and a thickness of approximately 40 nm, significantly or very significantly smaller than its length.

Figure 8:
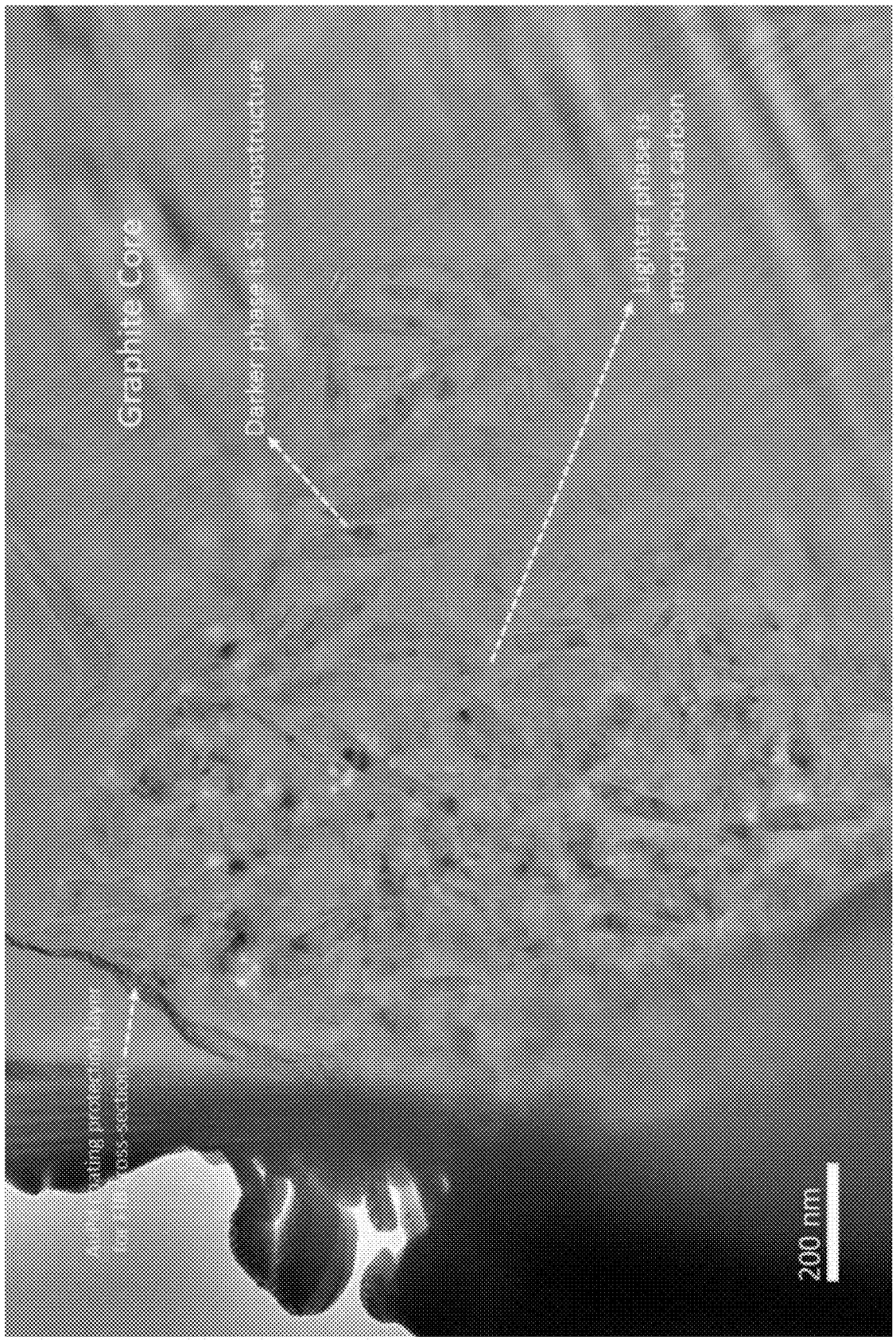
FIG. 8 is a low magnification TEM image (i.e., a cross-sectional TEM image) showing portions of another representative sample SCN particle produced in accordance with Example 1, showing portions of the SCN particle's core graphite particle, the outer surface of which has an amorphous carbon layer adhered thereto, within which silicon nanostructures having plate-like morphologies reside.

FIG. 8 is a low magnification TEM image (i.e., a cross-sectional TEM image) showing portions of another representative sample SCN particle produced in accordance with Example 1, showing portions of the SCN particle's core graphite particle, the outer surface of which has an amorphous carbon layer adhered thereto, within which silicon nanostructures reside, including many silicon nanostructures having plate-like morphologies. As indicated in FIG. 8, various silicon nanostructures exhibited bar-like or rod-like morphologies (e.g., as silicon nanobars or nanorods).

In another low magnification cross sectional TEM image taken across a random cross sectional slice or plane of an SCN particle obtained from an additional representative sample of SCN particles produced in accordance with Example 1, the approximate lengths and approximate thicknesses of 195 silicon nanostructures within this random cross section were approximated, estimated, or measured within the TEM image, and mapped or converted from TEM image to physical space dimensions in a manner readily understood by individuals having ordinary skill in the relevant art. The 195 silicon nanostructures considered exhibited an estimated or effective median length of approximately 120 nm; an estimated or effective thickness of approximately 47 nm; and an estimated or effective median exposed side surface area within this random cross section of approximately 5,213 $nm^2$, where the exposed side surface area was defined as length multiplied by thickness (e.g., corresponding to a particular side surface of the silicon nanostructure that was exposed in the random cross sectional slice or plane under consideration during TEM imaging) Moreover, among these 195 silicon nanostructures, a minimum length of approximately 37 nm; a maximum length of approximately 353 nm; a length standard deviation of approximately 63.84 nm; a minimum thickness of approximately 7 nm; a maximum thickness of approximately 212 nm; a thickness standard deviation of approximately 36.33 nm; a minimum exposed side surface area of approximately 549 $nm^2$; a maximum exposed side surface area of approximately 63,529 $nm^2$; and an exposed side surface area standard deviation of 10,200 $nm^2$ were observed within the aforementioned random cross section.

Figure 9:
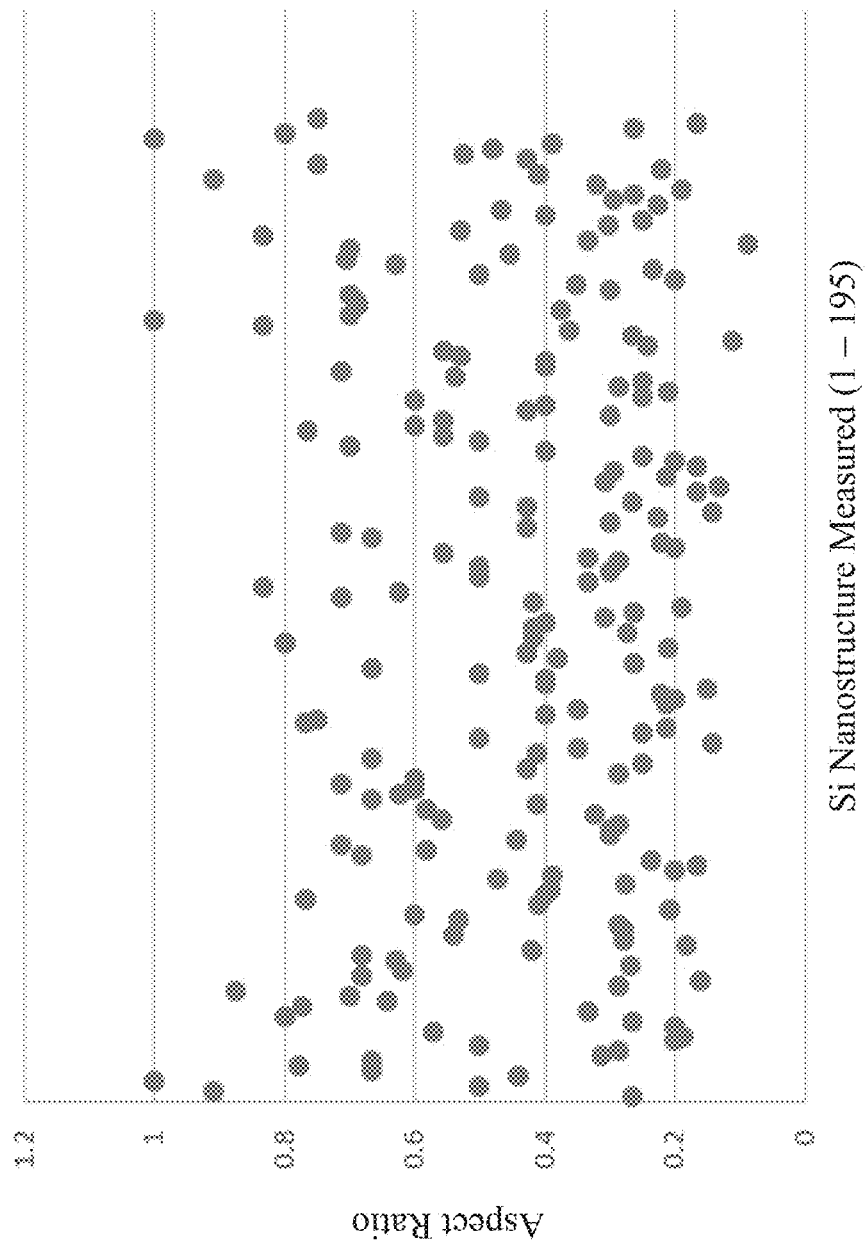
FIG. 9 is a plot showing calculated silicon nanostructure aspect ratios for 195 silicon nanostructures for which physical lengths and thicknesses were estimated, determined, or measured based on a cross-sectional TEM image of a representative sample SCN particle produced in accordance with Example 1, where the aspect ratios were calculated as thickness/length ratios.

Further to the foregoing, an aspect ratio for each of the aforementioned 195 silicon nanostructures was calculated as a silicon nanostructure thickness/length ratio (e.g., corresponding to an exposed side surface aspect ratio). FIG. 9 is a plot showing such calculated silicon nanostructure aspect ratios for these 195 silicon nanostructures. The 195 silicon nanostructures exhibited a median aspect ratio of 0.400, with a standard deviation of 0.211.

Figure 10:
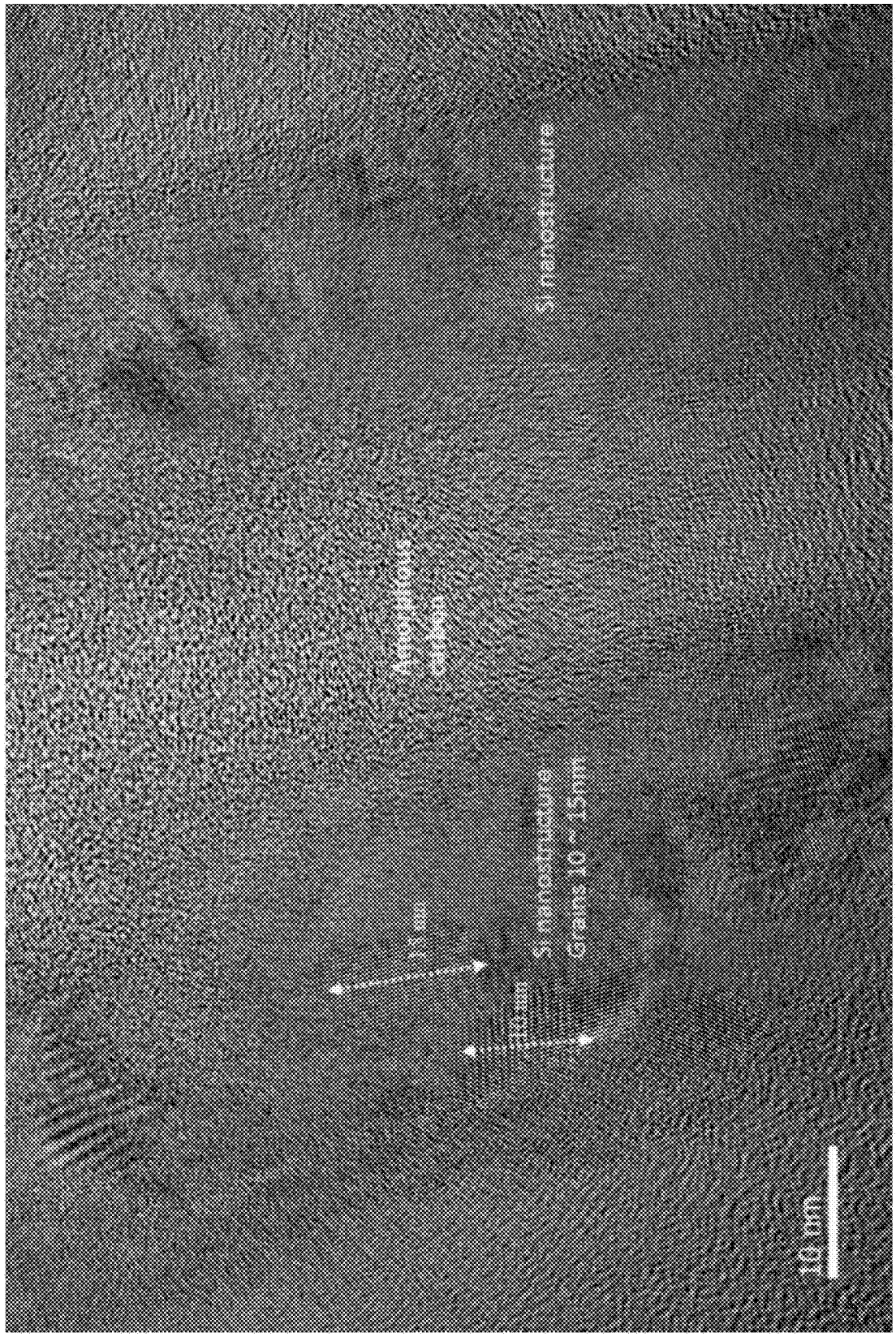
FIG. 10 is a high magnification TEM image (i.e., a cross-sectional TEM image) of yet another representative sample SCN particle produced in accordance with Example 1, showing representative approximate silicon nano-grain dimensions within representative silicon nanostructures.

FIG. 10 is a high magnification TEM image (i.e., a cross-sectional TEM image) of yet another representative sample SCN particle produced in accordance with Example 1, showing that the silicon nanostructures exhibited or were formed as grain structures, e.g., nano-grains, having dimensions (e.g., lengths and thicknesses or widths) typically between approximately 10-15 nm. Such nano-grain dimensions were observed across a random or essentially random cross sectional slice or plane through the amorphous carbon layer, e.g., in a manner indicated above.

Figure 11:
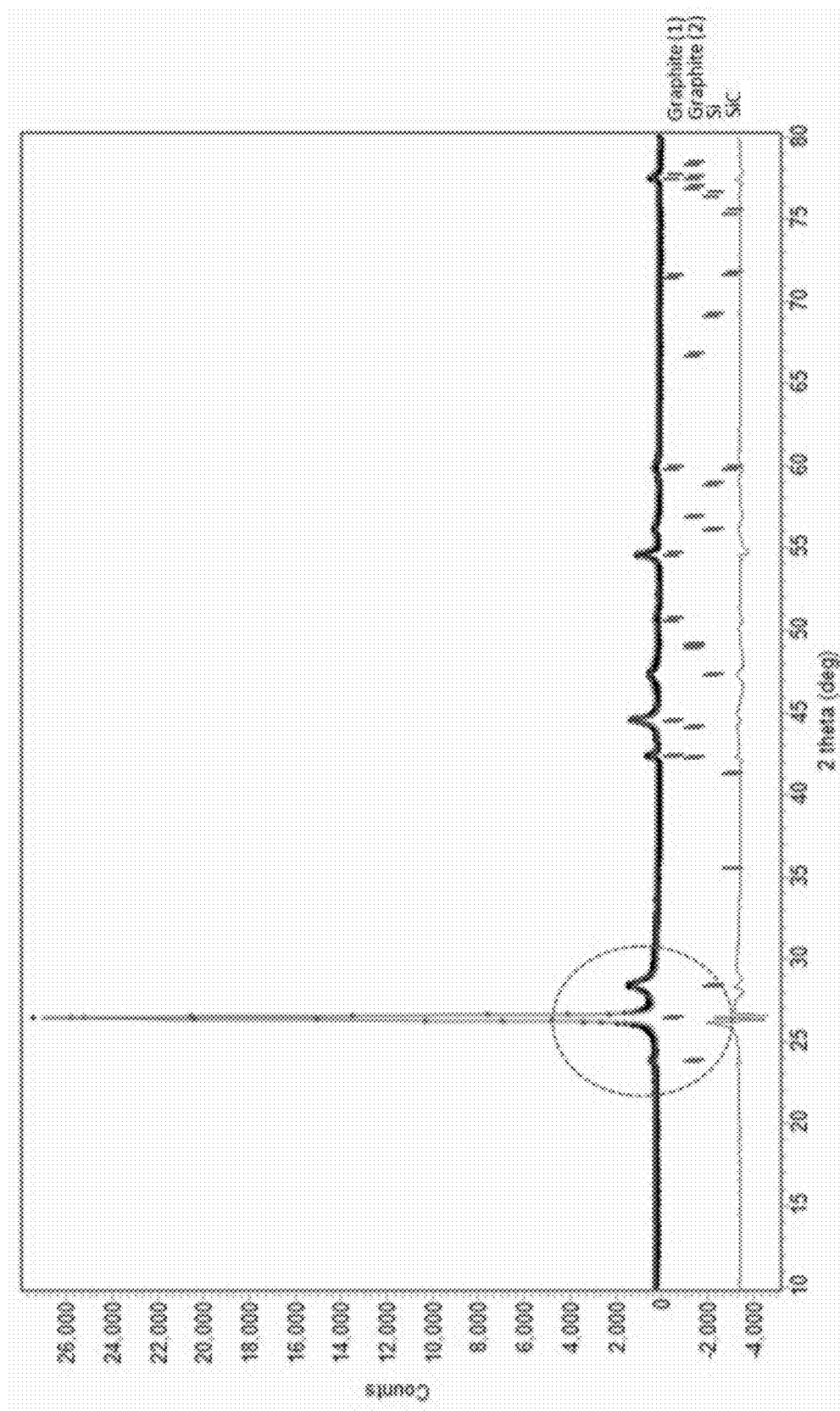
FIG. 11 shows X-ray diffraction (MU)) scan results corresponding to sample SCN particles produced in accordance with Example 1.

FIG. 11 shows X-ray diffraction (XRD) scan results corresponding to sample SCN particles produced in accordance with Example 1. A graphite peak intensity occurred at an XRD count of approximately 27473; and a silicon peak intensity occurred at an XRD count of approximately 1535 indicating such SCN particles had a silicon main peak (28.3°)/graphite peak main ratio (26.4°) of approximately 0.06.

Further compositional analysis of the SCN particles of Example 1 indicated that SCN particles of Example 1 contained approximately 78.3% carbon, approximately 2.0% oxygen, and approximately 9.5% silicon, which were determined by way of a LECO chemical analyser (LECO Corporation, St. Joseph, Mich., USA).

EXAMPLE 2

Production and Testing of Representative Lithium Ion Battery Structures

First SCN particle samples were produced in accordance with the first process 100 set forth above, i.e., the process 100 of FIGS. 1A-1B; and second SCN particle samples were produced in accordance with the second process 200 set forth above, i.e., the process 200 of FIGS. 2A-2B.

A first set of forty stack-type pouch cell lithium ion battery structures having capacities of 2.0 Amp-hours (Ah) was fabricated using the first SCN particle samples; and a second set of forty stack-type pouch cell lithium ion battery structures having capacities of 2.0 Ah was fabricated using the second SCN particle samples. These 2.0 Ah lithium ion battery structures can be referred to as low capacity or surrogate cells. Surrogate cell design details are as follows, where indicated percentages are wt % unless otherwise indicated.

With respect to their cathodes, the surrogate cells utilized nickel cobalt manganese (NCM) 811 cathode material; cathode electrode dimensions of 82×85 mm$^2$; an aluminium foil thickness of 12 μm; a cathode binder of 3% polyvinylidene fluoride; 0.7% carbon nanotube conductive material; and 1.3% Super P carbon black (SPCB).

With respect to their anodes, the surrogate cells utilized a blend of SCN material particles:additional graphite particles in a mass ratio of 10:90 as the anode material; anode electrode dimensions of 78×81 mm$^2$; a copper foil thickness of 8 μm; an anode binder of 1.8% SBR; and 1.3% CMC With respect to separators, the surrogate cells utilized 12 um polypropylene (PP)/polyethylene (PE) separator materials having a 9 μm ceramic coating on both sides.

The electrolyte utilized was 1.0 NI lithium hexafluorophosphate (LiPF6) in an ethylene carbonate (EC)/ethyl-methyl carbonate (EMC)/dimethyl carbonate (DMC) solvent mixture, with fluoroethylene carbonate (FEC) additive.

Testing of the charge-discharge performance of the first and second sets of surrogate cells occurred at room temperature, particularly to determine capacity retention across multiple charge-discharge cycles.

Based on the structural design of the first set of surrogate cells, a corresponding first set of forty stack-type pouch cell lithium ion battery structures having capacities of 45.0 Ah, which can be referred to as a first set of large cells, was fabricated using the first SCN particle samples. Additionally, based on the structural design of the second set of surrogate cells, a corresponding second set of forty stack-type pouch cell lithium ion battery structures having capacities of 45.0 Ah, which can be referred to as a second set of large cells, was fabricated using the second SCN particle samples.

Testing of the charge-discharge performance of the first and second sets of large cells occurred at room temperature, particularly to determine capacity retention across multiple charge-discharge cycles.

Measured and/or estimated room temperature capacity retention results for the first and second sets of surrogate cells and the first and second sets of large cells are summarized in Table 1, as follows:

TABLE 1

Room Temperature Capacity Retention for First and Second Sets of Surrogate and Large Cells Having SCN Particles Produced by First and Second Processes 100, 200.

| SCN Fabrication Technique | Battery | Retention @ 300 Cycles | Retention @ 500 Cycles |
| --- | --- | --- | --- |
| Process 100 of FIGS. 1A-1B | 2.0 Ah Surrogate Pouch Type Cell | 95% | 92% |
| | 45 Ah Pouch Type Cell | 96% | 93% |
| Process 200 of FIGS. 2A-2B | 2.0 Ah Surrogate Pouch Type Cell | 93% | 91% |
| | 45 Ah Pouch Type Cell | 95% | 91% |

For the first set of surrogate cells, measured and/or estimated/calculated room temperature capacity retention was approximately 95% after 300 charge-discharge cycles, and approximately 92% after 500 charge-discharge cycles. Similarly, for the first set of large cells, measured and/or estimated/calculated room temperature capacity retention was approximately 96% after 300 charge-discharge cycles, and approximately 93% after 500 charge-discharge cycles.

For the second set of surrogate cells, measured and/or estimated/calculated room temperature capacity retention was approximately 93% after 300 charge-discharge cycles, and approximately 91% after 500 charge-discharge cycles. Similarly, for the second set of large cells, measured and/or estimated/calculated room temperature capacity retention was approximately 95% after 300 charge-discharge cycles, and approximately 91% after 500 charge-discharge cycles.

In view of the foregoing, the first and second sets of large cells thus exhibited very good or excellent capacity retention. Moreover, although the first set of large cells exhibited slightly better capacity retention than the second set of large cells, the capacity retention of the second set of large cells was nearly equal to that of the first set of large cells.

The above description details aspects of processes, compositions, structures, and devices in accordance with particular non-limiting representative embodiments of the present disclosure. It will be readily understood by a person having ordinary skill in the relevant art that modifications can be made to one or more aspects or portions of these and related embodiments without departing from the scope of the present disclosure, which is limited only by the following claims.

The invention claimed is:

1. A silicon-carbon nanocomposite (SCN) material comprising SCN particles, wherein each SCN particle comprises:
   a graphite particle core having an outer surface, wherein the graphite particle core comprises a synthetic graphite particle core with low porosity;
   silicon nanostructures distributed across at least portions of the outer surface of the graphite particle core, wherein the silicon nanostructures comprise a median length of the nanostructures is in a nanometer scale, each silicon nanostructure comprises
      a plate-like morphology which is non-spheroidal, the plate-like morphology includes first and second planar 2D surfaces,
      melted pitch particles encasing the silicon nanostructure, wherein the melted pitch particle improves adhesion of the silicon nanostructure to the graphite particle core; and
   an amorphous carbon layer or matrix that encapsulates the silicon nanostructures and at least portions of the graphite particle core, wherein the silicon nanostructures are absent from pores of the graphite core.

2. The SCN material of claim 1, wherein the amorphous carbon layer or matrix and the silicon nanostructures encapsulated therein at least partially fills-in variations in the contours or topography of the outer surface of the graphite particle core in a conformal manner.

3. The SCN material of claim 1, wherein the plate-like morphology comprises three orthogonal axes relative to which each silicon nanostructure is positioned or aligned, wherein:
   a first axis extends along a largest or longest physical span or spatial extent of the silicon nanostructure, the first axis establishes the silicon nanostructure's length;
   a second axis orthogonal to the first axis extends along a next largest physical span of the silicon nanostructure, the second axis establishes the silicon nanostructure's width; and a third axis orthogonal to the first and second axes extends along a smallest physical span of the silicon nanostructure, the third axis establishes the silicon nanostructure's thickness.

4. The SCN material of claim 3, wherein each silicon nanostructure comprises a mean aspect ratio defined by a ratio of the thickness of the silicon nanostructure to the length of the silicon nanostructure within a cross sectional plane through the amorphous carbon layer or matrix is between 0.20-0.60.

5. The SCN material of claim 4, wherein silicon nanostructures comprise a median length between 50-300 nm.

6. The SCN material of claim 5, wherein the silicon nanostructures comprise nanosilicon grains having an average grain size of 10-45 nm.

7. The SCN material of claim 1, wherein the amorphous carbon layer or matrix has a thickness between 250-1500 nm.

8. The SCN material of claim 1, wherein each SCN particle comprises:
a graphite:silicon:amorphous carbon mass ratio of 70-90: 5-20:5-20; and
wherein
the SCN particle includes nonzero amounts of each of silicon, graphite, and amorphous carbon, and
amounts of silicon, graphite and amorphous carbon total to 100%.

9. The SCN material of claim 8, wherein at least some SCN particles within the SCN material comprises a graphite: silicon:amorphous carbon mass ratio of 80:10:10.

10. The SCN material of claim 1, wherein the graphite particle core has a porosity of less than 15%.

11. The SCN material of claim 10, wherein the graphite particle core comprises a synthetic graphite particle having a porosity of less than 3%.

12. The SCN material of claim 1 which is manufactured by the process comprising:
providing or producing a first powder comprising primary graphite particles having nanoscale silicon particles on outer surfaces thereof;
subjecting the first powder to a high shear mixing procedure to produce a second powder comprising the primary graphite particles carrying the silicon nanostructures distributed on the outer surfaces thereof;
distributing a source of amorphous carbon over or across the primary graphite particles carrying silicon nanostructures in the second powder; and
producing, by way of a carbonization procedure, an amorphous carbon layer or matrix at least partially surrounding the outer surface of each primary graphite particle, and within which the silicon nanostructures having plate-like morphologies carried by each primary graphite particle is embedded.

13. The method of claim 12, wherein the primary graphite particles comprise synthetic graphite particles having a porosity of less than 15%.

14. The method of claim 13, wherein the primary graphite particles comprise synthetic graphite particles having a porosity of less than 3%.

15. The method of claim 12, wherein the carbonization procedure is performed at a temperature between 700-1000° C. in a furnace.

16. The method of claim 12, wherein the source of amorphous carbon comprises pitch.

17. The method of claim 12, wherein the source of amorphous carbon comprises solid pitch particles.

18. The method of claim 17, wherein distributing the source of amorphous carbon over or across the graphite particles carrying silicon nanostructures comprises:
mixing solid pitch particles with the graphite particles carrying silicon nanostructures to form a third powder; and
softening and/or melting the pitch particles within the third powder, while concurrently subjecting the third powder to mixing forces.

19. The method of claim 18, wherein softening and/or melting the pitch particles within the third powder comprises subjecting the pitch particles therein to a temperature between 200-550° C., and wherein subjecting the third powder to mixing forces comprises at least one of rotating the third powder and subjecting the third powder to a kneading procedure in a kneading machine.

20. The method of claim 18, wherein:
softening and/or melting the pitch particles within the third powder while concurrently subjecting the pitch particles subjecting the third powder to mixing forces comprises:
rotating the third powder in a rotary furnace; and
subjecting the third powder to a temperature between 200-550° C. in the rotary furnace; and
the carbonization procedure comprises carbonizing the source of amorphous carbon at a temperature between 250-1000° C. in the rotary furnace.

21. The method of claim 12, wherein each of: providing the first powder, subjecting the first powder to a high shear mixing procedure; combining and mixing the graphite particles carrying silicon nanostructures on the outer surfaces thereof with a source of amorphous carbon; distributing the source of amorphous carbon over or across the graphite particles carrying silicon nanostructures; and producing the amorphous carbon layer or matrix occurs under an inert or essentially inert atmosphere.

22. The method of claim 12, wherein the high shear mixing procedure occurs in a temperature controlled manner by way of a temperature control system, mechanism, or chiller that maintains a high shear mixing temperature of less than 40° C.

23. The method of claim 12, further comprising milling and/or sieving the graphite particles carrying the amorphous carbon layer within which the silicon nanostructures having plate-like morphologies are embedded to eliminate particles having median particle sizes greater than a predetermined maximum median particle size.

24. The method of claim 12, further comprising prior to providing or producing a first powder:
providing or producing a slurry comprising:
a solvent carrying nanoscale silicon particles;
graphite particles; and
a binder; and
drying the slurry under an inert or essentially inert atmosphere to obtain the first powder; and
maintaining the first powder under the inert or essentially inert atmosphere.

25. A lithium ion (Li-ion) battery comprising an anode electrode carrying the SCN material of claim 1.

26. The Li-ion battery of claim 25, further comprising:
a cathode electrode;
a liquid or solid state electrolyte; and
a pouch, prismatic, or cylindrical structure in which the anode electrode, the cathode electrode, and the electrolyte reside.

27. The Li-ion battery of claim 25, wherein the SCN material of the anode electrode comprises approximately 3-20% SCN particles mixed with approximately 80-97% additional graphite particles by mass.

28. The Li-ion battery of claim 27, wherein the SCN material of the anode electrode comprises 10-15% SCN particles mixed with approximately 85-90% additional graphite particles by mass.

\* \* \* \* \*